US011148449B2

(12) United States Patent
Zhu et al.

(10) Patent No.: US 11,148,449 B2
(45) Date of Patent: Oct. 19, 2021

(54) PHOTOTHERMAL MODIFICATION OF PLASMONIC STRUCTURES

(71) Applicant: Danmarks Tekniske Universitet, Kgs. Lyngby (DK)

(72) Inventors: Xiaolong Zhu, Kgs. Lyngby (DK); Anders Kristensen, Frederiksbeg (DK); Emil Højlund-Nielsen, Copenhagen (DK); Christoph Vannahme, Charlottenlund (DK); Niels Asger Mortensen, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 162 days.

(21) Appl. No.: 15/580,986

(22) PCT Filed: Jun. 10, 2016

(86) PCT No.: PCT/EP2016/063382
§ 371 (c)(1),
(2) Date: Dec. 8, 2017

(87) PCT Pub. No.: WO2016/198657
PCT Pub. Date: Dec. 15, 2016

(65) Prior Publication Data
US 2018/0178571 A1 Jun. 28, 2018

(30) Foreign Application Priority Data
Jun. 12, 2015 (EP) ..................................... 15171905

(51) Int. Cl.
*B41M 5/34* (2006.01)
*G02B 5/00* (2006.01)
(Continued)

(52) U.S. Cl.
CPC ............. *B41M 5/34* (2013.01); *B23K 26/354* (2015.10); *B41M 5/40* (2013.01); *B41M 5/46* (2013.01);
(Continued)

(58) Field of Classification Search
CPC . B41M 5/34; B41M 5/40; B41M 5/46; B41M 7/0081; G02B 5/008;
(Continued)

(56) References Cited

U.S. PATENT DOCUMENTS 8,323,553 B2 * 12/2012 Lee .................... H05K 3/102
264/402
10,088,428 B2 * 10/2018 Kristensen ............ G01J 3/0245
(Continued)

FOREIGN PATENT DOCUMENTS

WO WO 2013/039454 A1 3/2013
WO WO 2014/194920 A1 * 12/2014 ............. G02B 1/005
WO WO 2015/028037 A1 3/2015

OTHER PUBLICATIONS

Paul A. Tipler; Physics; section 26-6 "Diffraction and Resolution"; Worth Publishers, Inc.; New York, NY; 1976 (no month); pp. 616-618.*
(Continued)

*Primary Examiner* — Kristal Feggins
(74) *Attorney, Agent, or Firm* — Knobbe Martens Olson & Bear LLP

(57) ABSTRACT

There is presented a method for geometrically modifying plasmonic structures on a support structure, such as for printing or recording, said method comprising changing a geometry specifically of plasmonic structures, wherein said changing the geometry is carried out by photothermally melting at least a portion of each of the plasmonic structures within the second plurality of plasmonic structures by irra-
(Continued)

diating, the plasmonic structures with incident electromagnetic radiation having an incident intensity in a plane of the second plurality of plasmonic structures, wherein said incident intensity is less than an incident intensity required to melt a film of a corresponding material and a corresponding thickness as the plasmonic structures within the second plurality of plasmonic structures.

12 Claims, 14 Drawing Sheets

(51) Int. Cl.
  *G11B 11/03*    (2006.01)
  *B41M 5/46*    (2006.01)
  *B41M 7/00*    (2006.01)
  *B23K 26/354*    (2014.01)
  *B41M 5/40*    (2006.01)
  *G02B 5/18*    (2006.01)
  *G02B 5/20*    (2006.01)

(52) U.S. Cl.
  CPC ........... *B41M 7/0081* (2013.01); *G02B 5/008* (2013.01); *G11B 11/03* (2013.01); *G02B 5/1809* (2013.01); *G02B 5/1842* (2013.01); *G02B 5/203* (2013.01); *G02B 2207/101* (2013.01)

(58) Field of Classification Search
  CPC .... G02B 5/1809; G02B 5/1842; G02B 5/203; G02B 2207/101; C23C 14/5813; G11B 11/00; G11B 11/03; B23K 26/354
  USPC ................ 427/554, 555, 556, 557, 558, 559
  See application file for complete search history.

(56) References Cited

U.S. PATENT DOCUMENTS

| | | | |
|---|---|---|---|
| 2007/0230233 A1* | 10/2007 | Takahashi | G11B 11/00 365/145 |
| 2009/0087582 A1* | 4/2009 | Watanabe | B82Y 20/00 427/558 |
| 2010/0323917 A1* | 12/2010 | Vertes | G01N 33/4833 506/12 |
| 2014/0226139 A1* | 8/2014 | Csete | G03F 7/70408 355/53 |
| 2014/0302255 A1* | 10/2014 | Spicer | C23C 16/045 427/554 |
| 2015/0042702 A1 | 2/2015 | Jiang et al. | |
| 2016/0202394 A1* | 7/2016 | Clausen | G02B 5/008 428/148 |
| 2017/0269002 A1* | 9/2017 | Kristensen | G01J 3/0245 |
| 2018/0329115 A1* | 11/2018 | Kildishev | G01N 21/21 |
| 2019/0339543 A1* | 11/2019 | Zhu | G02B 5/288 |
| 2020/0285043 A1* | 9/2020 | Nyga | G02B 5/008 |

OTHER PUBLICATIONS

"A study of light; Contrasting Impressionism and Pointillism"; Google Arts & culture.mht; retrieved Oct. 26, 2020 (no date given for article, dates given for individual illustrated paintings discussed).*

Chen, Xi et al., "Nanosecond Photothermal Effects in Plasmonic Nanostructures" ACS Nano, 2012, pp. 2550-2557, vol. 6, No. 3.

Clausen, Jeppe S. et al., "Plasmonic Metasurfaces for Coloration of Plastic Consumer Products" Nano Lett, 2014, p. 4499, vol. 14, (pp. A-F, 6 pages supplied).

Tan, Shawn J. et al., "Plasmonic Color Palettes for Photorealistic Printing with Aluminum Nanostructures" Nano Letters, 2014, pp. 4023-4029, vol. 14.

Wang, Jing et al., "Photothermal reshaping of gold nanoparticles in a plasmonic absorber" Optics Express, Jul. 2011, pp. 14726-14734, vol. 19, No. 15.

Zijlstra, Peter, et al., "Five-dimensional optical recording mediated by surface plasmons in gold nanorods" Nature, May 2009, pp. 410-413, vol. 459.

International Preliminary Report on Patentability for PCT/EP2016/063382 dated Sep. 12, 2017.

International Search Report for PCT/EP2016/063382 dated Sep. 27, 2016.

* cited by examiner

PHOTOTHERMAL MODIFICATION OF PLASMONIC STRUCTURES

CROSS REFERENCE TO RELATED APPLICATIONS

This application is a U.S. National Phase Application of PCT International Application Number PCT/EP2016/063382, filed on Jun. 10, 2016, designating the United States of America and published in the English language, which is an International Application of and claims the benefit of priority to European Patent Application No. 15171905.1, filed on Jun. 12, 2015. The disclosures of the above-referenced applications are hereby expressly incorporated by reference in their entireties.

FIELD OF THE INVENTION

The present invention relates to modification of structures, such as for printing or data storage, more particularly photothermal modification of plasmonic structures and a corresponding product and use thereof.

BACKGROUND OF THE INVENTION

It may be beneficial to provide structures which can serve to yield, e.g., colour or if arranged properly—images.

WO 2013/039454 A1 is directed to an optical arrangement. The optical arrangement includes a substrate, and a plurality of spaced apart elongate nanostructures extending from a surface of the substrate, wherein each elongate nanostructure includes a metal layer on the end distal from the surface of the substrate. It also relates to a method of forming the optical arrangement.

The reference "Five-dimensional optical recording mediated by surface plasmons in gold nanorods", Peter Zijlstra et al., NATURE, NATURE PUBLISHING GROUP, UNITED KINGDOM, vol. 459, 21 May 2009, pages G02B5/18410-413, describes five-dimensional optical recording by exploiting the unique properties of the longitudinal surface plasmon resonance (SPR) of gold nanorods.

The patent application US 2015/0042702 A1 describes A display media including a pixel layer containing subpixels for different optical bands composed of nano-scale structures and an intensity control layer that can pattern the luminance of the subpixels.

The reference "Plasmonic color 4-6 palettes for photorealistic printing with aluminum nanostructures", Shawn J Tan et al., Nano letters, 9 Jul. 2014, pages 4023-4028.

However, an improved method of providing structures, such as optical arrangements, would be advantageous, and in particular a more efficient and/or reliable method would be advantageous.

SUMMARY OF THE INVENTION

It may be seen as an object of the present invention to provide a method for geometrically modifying plasmonic structures on a support structure that may be seen as advantageous, e.g., because it may be carried out in an economic, reliable and fast manner at a very high resolution.

It may be seen as a further object of the present invention to provide an alternative to the prior art.

Thus, the above described object and several other objects are intended to be obtained in a first aspect of the invention by providing a method for geometrically modifying plasmonic structures on a support structure, such as printing or recording by the modifying of the plasmonic structures, said method comprising:

a. Providing a support structure, said support structure being a solid polymer, such as a support structure with a first plurality of topographical features, such as said topographical features being pillars and/or holes, b. Providing a first plurality of plasmonic structures, such as each plasmonic structure being placed on or in or at a corresponding topographical feature, such as a plurality of unit cells each comprising a particle (e.g., a metallic nanometer sized disk) and a hole (e.g., a nanometer sized hole in a metallic thin film) wherein the particle and hole in each unit cell is arranged so as to allow plasmon hybridization, said plasmonic structures being supported by the support structure, such as said first plurality of plasmonic structures being in contact with said polymer, such as a two-dimensional plane comprising the first plurality of plasmonic structures being adjacent or coincident with a surface of the polymer support, c. Changing a geometry specifically of plasmonic structures within a second plurality of plasmonic structures, wherein the second plurality of plasmonic structures is a sub-set of the first plurality of plasmonic structures, wherein said changing the geometry is carried out by photothermally melting at least a portion of each of the plasmonic structures within the second plurality of plasmonic structures by irradiating, such as via a LASER, such as a narrow band LASER emitting in the visible spectrum, such as via a pulsed LASER, the second plurality of plasmonic structures with incident electromagnetic radiation having an incident intensity in a plane of the second plurality of plasmonic structures, and thereby exciting localized surface plasmon resonances associated with each of the plasmonic structures within the second plurality of plasmonic structures, wherein said incident intensity is less than an incident intensity required to melt a film of a corresponding material and a corresponding thickness as the plasmonic structures within the second plurality of plasmonic structures, such as wherein the change in geometry of the second plurality of plasmonic structures relies on photon energy being redistributed with optical field confinement and enhancement by the plasmonic structures.

The invention is particularly, but not exclusively, advantageous for obtaining a method which enables a method for geometrically modifying plasmonic structures on a support structure. This may be useful, e.g., for providing structures with certain geometries on a support surface, which may in turn be useful for a number of various purposes, such as printing or data storage. By employing photothermal melting, plasmonic structures may be geometrically reshaped by melting, or partial melting, at a very short time scale. By employing an incident radiation of relatively low intensity, it may surprisingly be possible to reshape specific structures within a set of closely spaced structures, which in turn enables, e.g., printing or storage of data, with very high resolution or density (by relying on redistribution of the energy in the incident radiation caused by localized surface plasmon resonance (LSPR)). Furthermore, it may be seen as an advantage, that it enables reshaping the plasmonic structures to various degrees, thereby enabling, e.g., color printing.

It is noted, that optical properties of the plasmonic structures may be relevant for transmission and/or reflection. For example, if a reflected colour can be seen on top of a surface, another transmitted colour may be seen on the other surface.

By 'geometrically modifying' may be understood modifying the geometry, whereby is understood shape, size, and relative position of figures. For example it may include changing a sphere into a smaller sphere (size), changing a disk into a sphere (shape and possibly size), changing a disk and hole configuration into a hole without the disk (changing a relative position of figures). It may be understood that the geometric modifications of the plasmonic structures may have an effect on their plasmonic properties and optionally their optical properties.

In the present context 'optical' may be understood as relating to within the visible electromagnetic spectrum.

By 'plasmonic structures' may be understood structures (e.g., metallic nanoparticles, holes in a metallic material, combinations of nanosized structures allowing gap plasmons or plasmon hybridization, etc.) whose electron density can couple with electromagnetic radiation of wavelengths that are larger, such as far larger, than the structures due to the nature of the dielectric-structure interface between the medium and the structures. It may be understood that plasmonic structures may correspond to a plurality of similar plasmonic structures, such as periodically arranged structures, which may optionally each correspond to a plurality of structures (such as a disk and a hole) which may interact with each other (e.g., giving rise to gap plasmons and plasmon hybridization) and where the plasmonic structures may be divided into unit cells.

It may be understood, that the plasmonic structures in the first plurality of plasmonic structures, may exhibit a resonance in the visible regime.

By 'support structure' may be understood a material supporting the plasmonic structures. It may be understood as a solid material whereupon the plasmonic structures are placed and/or wherein the plasmonic structures, such as each of the plasmonic structures within the first plurality of plasmonic structures, are embedded.

It is noted that polymer while polymer may be seen as advantageous, e.g., for allowing topographical features to be provided by nanoimprint lithography, polymer is not essential, and could in an alternative embodiment be another dielectric material, such as glass. The support structure basically needs to be a dielectric material, and optionally have a surface topography facilitating plasmonic resonances. For examples of possible polymer materials, TOPAS (COC (cyclic olefin copolymer)), Poly(methyl methacrylate) (PMMA), polyethylene (PE), polystyrene (PS).

The plasmonic structures on the solid support structure may form a metasurface.

By 'topographical features' may be understood features on a surface of a material which deviates from the plane of the surface. For example protrusions and indentations, such as pillars and holes.

By 'specifically' may be understood related to a well-determined set of plasmonic structures.

By 'the second plurality of plasmonic structures is a sub-set of the first plurality of plasmonic structures' may be understood that every plasmonic structure in the second plurality of structures is also in the first plurality of structures. It may in general be understood that the first plurality of structures is equal to or larger than the second plurality of structures. Thus, the sets may be equal to each other, which may be relevant if all structures should be modified, e.g., in a context of printing, if all pixels should change colour (cf., "bulk" colouring).

However, it may also more specifically be understood that the second plurality of plasmonic structures is smaller than (not equal to) the first plurality of plasmonic structures. This may be referred to as a proper (or strict) subset. This may be relevant for e.g., imaging or data storage, where the arrangement of the geometrically modified second plurality of plasmonic structures carries image information and/or data information.

By 'photothermally melting' may be understood melting, or partial melting, of a structure where the energy for raising the temperature from below a melting point to above a melting point (which may or may not be identical to a melting point of corresponding bulk material on a macroscopic scale) originates from irradiation with electromagnetic radiation, such as electromagnetic radiation from within the visible regime.

By the visible regime may be understood electromagnetic radiation (which in this regime may be referred to as 'light') with a wavelength between 380 nm and 760 nm.

By 'at least a portion of each of the plasmonic structures' may be understood that some—but not necessarily all—of the (each) plasmonic structure (which may correspond to a unit cell, such as a unit cell comprising a hole and a disk) is melted. It may be understood that in embodiments, an individual plasmonic structure, such as a unit cell, can be selectively modified.

By 'irradiating the second plurality of plasmonic structures with incident electromagnetic radiation' may be understood subjecting the second plurality of plasmonic structures with electromagnetic radiation, which electromagnetic radiation—before interaction with the plasmonic structures—is referred to as 'incident'.

By 'an incident intensity in a plane of the second plurality of plasmonic structures' may be understood the intensity in the plane of the second plurality of plasmonic structures before interaction with the plasmonic structures.

By 'exciting localized surface plasmon resonances' may be understood that the incident light for each plasmonic structure in the second plurality of plasmonic structures excites a localized surface plasmon resonance, By 'an incident intensity required to melt a film of a corresponding material and a corresponding thickness as the plasmonic structures within the second plurality of plasmonic structures' may be understood the intensity which would have been required in order to melt or start melting a film (in the plane of the second plurality of plasmonic structures) which film would be made of the same material as the second plurality of plasmonic structures (e.g., aluminium) and has the same thickness (as measured in a direction being parallel with a direction of propagation of the incident electromagnetic radiation).

It may be seen as a basic insight of the present inventors, that the change in geometry of the second plurality of plasmonic structures may be realized by a relatively low incident intensity, since it may rely on photon energy being redistributed with optical field confinement and enhancement by the plasmonic structures. It may furthermore be seen as a basic insight of the present inventors, that this effect may be utilized for reducing energy consumption and increasing resolution.

In an embodiment there is presented a method, wherein said incident intensity is less than 75%, such as less than 50%, such as less than 40%, such as less than 30%, such as less than 25%, such as less than 20%, such as less than 10%, such as less than 5%, such as less than 2%, such as less than 1%, such as less than 0.1%, such as less than 0.01%, of an incident intensity required to melt a film of corresponding material and thickness as the plasmonic structures within the second plurality of plasmonic structures. In an embodiment there is presented a method, wherein said incident intensity is within 0.01-10%, such as within 0.01-5%, such as within 0.01-1%, of an incident intensity required to melt a film of corresponding material and thickness as the plasmonic structures within the second plurality of plasmonic structures.

Having a relatively low incident intensity may be advantageous for reducing energy consumption and/or increasing spatial resolution and/or increasing the degree of geometrical change which may translate into, e.g., degree of colour change (in a printing context).

In an embodiment there is presented a method, wherein the plasmonic structures within the second plurality of plasmonic structures redistribute photon energy in the incident electromagnetic radiation, thereby enabling said melting.

In an embodiment there is presented a method, wherein the plasmonic structures, such as each of the plasmonic structures within the first plurality of plasmonic structures, have sizes within 0-1 µm, such as within 10-900 nm, such as within 50-500 nm, such as within 100-400 nm, such as 200 nm. By size may be understood the largest dimension.

In an embodiment there is presented a method, wherein said support structure comprises a first plurality of topographical features, such as said topographical features being pillars and/or holes. Topographical features in the support structure may be beneficial for enabling or facilitating providing plasmonic structures. For example, if the support structure comprises a plurality of pillars protruding from the surface, then plasmonic structures may be directly providing by depositing a metal film on the support structure, which may then for example yield coupled hole-disks. It may in general be understood, that each hole-disk unit cell is coaxial, but it is also conceivable that they are non-coaxial.

By 'pillars' may be understood protrusions, such as protrusions of a substantially cylindrical shape protruding from a surface.

By 'holes' may be understood indentations, such as indentations of a substantially cylindrical shape into a surface.

In a further embodiment there is presented a method, wherein the plasmonic structures are given by:
  metallic structures on or in said topographical features, such as on top of said pillars and/or in said holes, and
  holes in a metallic film, wherein said holes correspond to said topographical features, such as polymeric pillars protruding through the metallic film.

For the case of holes and pillars, this may be realized by having pillars of height $t_2$=30 nm, diameters D within, e.g., 80-140 nm, such as within 81-131 nm, such as 100 nm. The support structure with the pillars may be coated with a metallic film, such as an aluminum film, of a thickness $t_1$=20 nm, thereby providing disks with a corresponding height (as thickness $t_1$) on top of the pillars, and holes of corresponding "height" formed as holes in a the metallic film where the pillars "protrude" it. In case of a periodic arrangement of said pillars, a periodicity A may be given by, e.g., 100-400 nm, such as 200 nm.

The metal can be—but is not limited to—aluminium (Al), gold (Au), silver (Ag), copper (Cu), platinum (Pt). A possible advantage of aluminium is a relatively low melting point.

In a further embodiment there is presented a method further comprising
  preparing the topographical features, such as by nanoimprint lithography (NIL),
  preparing the first plurality of plasmonic structures by depositing a metallic film on the support structure with the topographical features.

Preparing the topographical features can be carried out by various methods which may in general be referred to as replication technologies, for example hot embossing, ultraviolet (UV) nano-imprint lithography (NIL), thermal nanoimprint lithography (NIL), roll-to-roll nanoimprint, roll-to-roll (R2R) extrusion coating, injection moulding.

A method according to any one of the preceding claims, wherein changing the geometry of a second plurality of plasmonic structures, comprises changing the geometry for plasmonic structures within the second plurality of plasmonic structures into a plurality of different geometries.

In an embodiment there is presented a method, wherein changing the geometry of a second plurality of plasmonic structures, comprises changing the geometry for different plasmonic structures within the second plurality of plasmonic structures into a plurality of different geometries, such as a plurality of different states being optically different with respect to each other, such as the plurality of different geometries including one or more of: a disk and a hole, a sphere and a hole, a hole, an enlarged hole. A possible advantage of such geometrical change into a plurality of geometries may be, that it enables having different geometries afterwards, which may be beneficial, e.g., for producing different colours, or for storing more data (e.g., each plasmonic structure may comprise more data than merely binary information, such as melted or not melted). The change into different geometries may be controlled, e.g., by controlling the incident intensity.

In an embodiment there is presented a method, wherein the plurality of different geometries each support a plasmonic resonance (such as a limited number of resonances, such as one or two) oscillating at a visible frequency. This may be advantageous for providing multiple, different (visible) colours.

In an embodiment there is presented a method, wherein changing the geometry of a plasmonic structure within second plurality of plasmonic structures is carried out in less than 1 millisecond, such as less than 100 ns, such as less than 10 ns, such as less than 1 ns. An advantage of a short timespan here may be that it enables rapidly changing said geometry, which in turn enables, e.g., a fast printing speed or data storage rate.

In an embodiment there is presented a method, wherein changing the geometry of a second plurality of plasmonic structures, comprises changing the optical characteristics within a visible portion of the electromagnetic spectrum. It may thus be understood, that the geometrical changes may entail visually observable changes, for example a colour change. By 'changing the optical properties' may be understood changing a plasmonic resonance within the visible spectrum, such as moving a resonance from one position within the visible spectrum to another position within the visible spectrum.

In an embodiment there is presented a method, wherein changing the geometry of a second plurality of plasmonic structures is carried out in a manner making the resulting change visible for a normal human viewer, such as the change in optical characteristics is:
  a. Spectrally and/or intensity resolvable by the human eye, and b. Large enough to be spatially resolvable by the human eye, such as a distance between changed plasmonic structures being at least 10 micrometer, such as at least 20 micrometer, such as at least 50 micrometer, such as at least 60 micrometer, such as 80 dots per cm, such as at least 100 micrometer, such as at least 120 micrometer, such as 160 dots per cm.

In other words, the method may enable a change in colour appearance, such as wherein after the geometrical modification, the geometrically modified plasmonic structures have a colour appearance. In general, this may be due to the plasmonic structures has spectral resonances/oscillations in the visible range before and/or after the geometrical modification, and which spectral resonances/oscillations are changed (spectrally moved and/or changed in intensity) during said geometrical modification.

In an embodiment there is presented a method, wherein resolution of the geometrically modified plasmonic structures on the support structure, such as a resolution of a color printing or data recording, is below the diffraction limit with respect to the incident electromagnetic radiation, such as wherein the incident electromagnetic radiation is within the visible part of the electromagnetic spectrum, such as at least 10 kDPI, such as at least 50 kDPI, such as at least 100 kDPI, such as at least 110 kDPI, such as at least 120 kDPI, such as at least 125 kDPI or higher, such as 127 kDPI, such as a morphology manipulating resolution of 50 nanometres or less, such as a morphology manipulating resolution of 20 nanometres or less, such as colour-pixel printing resolution of 200 nanometres or less, such as colour-pixel printing resolution of 200 nanometres or less. By 'kDPI' is understood kilo dots per inch, i.e., e.g., 10 kDPI is 10000 dots per inch.

In an embodiment there is presented a method, wherein changing the geometry of a second plurality of plasmonic structures, allows storing data, wherein a data storage rate may be given by 1 Gbit/s or more.

In an embodiment there is presented a method, wherein the photo-thermal energy is provided with any one of:
A spot focused LASER,
A spot focused LASER which is scanned through the second plurality of plasmonic structures so that changing the geometry is carried out in a sequential manner,
A line focused LASER,
A line focused LASER which is scanned through the second plurality of plasmonic structures so that changing the geometry is carried out in a sequential manner,
A 2D array LASER
A projected image.

For energy being provided with a LASER, this may be done in combination with scanning mirrors and/or in combination with a motorized stage, for enabling spatially selecting which plasmonic structures to geometrically modify. The projected image may be realized with a spatial light modulator, a digital micromirror device (DMD) or a mirror array. In general, it may be understood, that changing the geometry is carried out in a manner so that the secondary plasmonic structures defines a macroscopic group of structures and/or a non-circular group of structures (such as not merely focusing a light source within the first group of plasmonic structures, but rather—by scanning or projected images—provides a group of plasmonic structures which may carry more information and/or be visibly resolvable).

In an embodiment, there is presented a method, wherein changing the geometry of a second plurality of plasmonic structures takes place by:

Sequentially changing the geometry of different plasmonic structures, such as by scanning a spot or line focused laser,
OR
In parallel, such as by projection of an image.

In an embodiment, there is presented a method, wherein the first plurality of plasmonic structures is being encapsulated in a solid material before or after changing the geometry of a second plurality of plasmonic structures. An advantage of this may be that after encapsulation, the plasmonic structures are protected by the encapsulating (optionally transparent) material.

In an embodiment, there is presented a method, wherein the method further comprises geometrically modifying plasmonic structures on a support structure in one or more additional planes comprising additional plasmonic structures. This may be advantageous for increasing a data storage capacity, e.g., by stacking planes with plasmonic structures. This may also or alternatively be advantageous for three-dimensional imaging.

In an embodiment, there is presented a method, wherein changing the geometry of a specifically a second plurality of plasmonic structures, is carried out so as to enable any one or combinations of:
colour mixing,
half-toning
dithering.

According to a second aspect of the invention, there is presented a product comprising photothermally geometrically modified plasmonic structures, such as photothermally geometrically modified plasmonic structures provided according to the method according to the first aspect and said product optionally further comprising the support structure.

According to a third aspect of the invention, there is presented use of a
product comprising geometrically modified plasmonic structures provided according to the method according to the first aspect, or
a product according to the second aspect for any one of:
Macroscopically printing, such as printing visually observable text or images,
Microscopically printing, such as printing microscopic data for security purposes,
Storing data,
Assessing laser power,
Sensing.

For example, laser power may be assessed by carrying out the method and observing a colour of the plasmonic structures afterwards, which colour may correspond to a geometrical change caused by a given incident laser intensity, which can then be ascribed to the laser subjected to assessment.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The method for geometrically modifying plasmonic structures on a support structure according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1A:
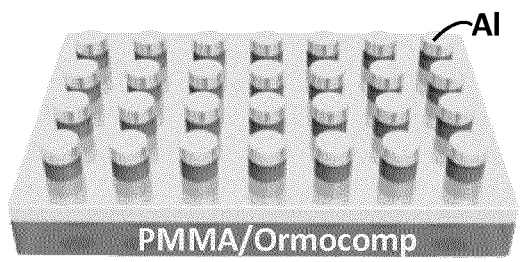
FIG. 1a shows a schematic illustration of the sample structure.

In this application, the inventors propose and demonstrate a new principle, which may for example be applicable for a color laser printer capable of printing colors with a super-high resolution of 127,000 dots per inch (DPI), i.e., 127 kDPI. With nanosecond pulsed laser irradiation, i.e., incident electromagnetic radiation, transient thermal power generated in plasmonic metasurfaces introduces structure melting and reshaping, i.e., changing the geometry by photothermally melting at least a portion of each of the plasmonic structures in the plasmonic metasurface. Different surface morphologies support plasmonic resonances oscillating at different visible frequencies, such as a limited set of visible frequencies, e.g., 1 or 2 visible frequencies, leading to different color apparency (which may be reflection and/or transmission). Importantly and surprisingly, by using the plasmon-reinforced melting threshold effect, the inventors show that the sub-diffraction-limited multi-color images can be easily produced to give a 200 nm spatial resolution of color pixels.

Color printing is indispensable for everyday life, which is all-embracing from packaging, decoration, tagging to publishing, painting and so on. Large-scale production and usage of pigment-based color printing for centuries have brought signicant environment and sustainability problems to modern civilizations. Coloration strategy by utilizing optical structures may be a promising substitute. Structural colors of photonic crystals and plasmonic nanostructures and metasurfaces based on the optical resonances offer an attractive approach which provides new perspectives for recycling and sustainability. Different from colors in optically large photonic crystals color generating in plasmonic metasurfaces has the advantages of ultra-small volume and subwavelength resolutions, with the simultaneous production of full colors. However, for challenging the traditional color printing used in consumer products, there are still several bottlenecks. For instance, plasmonic color pixels may previously have been pre-designed and printed by e-beam lithography (EBL) and based on noble metals and rigid substrates, which hindered up-scaling, economic price and convenient usage. In this application, the inventors present a method which enables printing plasmonic colors by a portable laser printer on cheap and flexible "papers" (where by "paper" in quotation marks is understood a surface, such as a support (for example a polymeric support) with plasmonic structures which can be printed upon according to the inventive method, and which may hence function in a similar manner as the well-known fiber (e.g., cellulose fiber) based paper commonly used today for print jobs).

In the application, the inventors describe a method of ink-free and full-color laser printing on recyclable plasmonic metasurfaces which has potential to become an environmentally friendly alternative to traditional printing technology. With the aid of the collective oscillation of free carriers, plasmonic nanostructrues can manipulate and enhance the light-matter interaction in a deep subwavelength volume leading to a high energy density and intense heating inside. In this context, the inventors use the nano-scale local heating caused by irradiation of a nanosecond laser to regulate the morphologies (which may in this context be used interchangeably with geometry) of plasmonic metasurfaces thus continuously tuning plasmonic resonances across the visible spectrum and synchronously generating full colors. The application further shows that the diffraction limit in printing can be exceeded by a plasmon-reinforced threshold effect to give a morphology manipulating resolution of sub-20 nanometres and color-pixel printing resolution of 200 nanometers.

Materials and Methods

Regarding preparation of samples (where by samples may be understood the support structure and the first plurality of plasmonic structures): Firstly, a silicon master mold was fabricated by using electron-beam lithography (EBL) and dry etching. A fast single spot writing technique allows high writing speeds. The sample was fabricated on a 0.5 mm thick 4 inch Borofloat glass wafer where upon a thin film of Ormocomp® (alternatively another UV Curable Hybrid Polymer suitable for Moulding may also be used) mixed with ma-T 1050 thinner (25% w/w, both micro resist technology) was dropped with a thickness of approximately 20 µm. The silicon stamp coated with antistiction coating was used for replicating the pillar structure via room temperature nanoimprint into the Ormocomp® layer. The Ormocomp® film was cured by exposure to UV light and separated from the silicon master and peeled from the Borofloat glass substrate afterwards. Then, 20 nm Al films are deposited by an electron beam evaporator (Alcatel) at 5 Å/s onto clean room cleaned samples after imprint under a process pressure of $10^{-6}$-$10^{-5}$ mbar. For polymer coated samples, an efficiently thick PMMA is spin-coated on top. Here, Ormocomp® and PMMA is used, but in general, abundant polymers suitable for nanoimprinting can be used for fabricating the samples.

Figure 6:
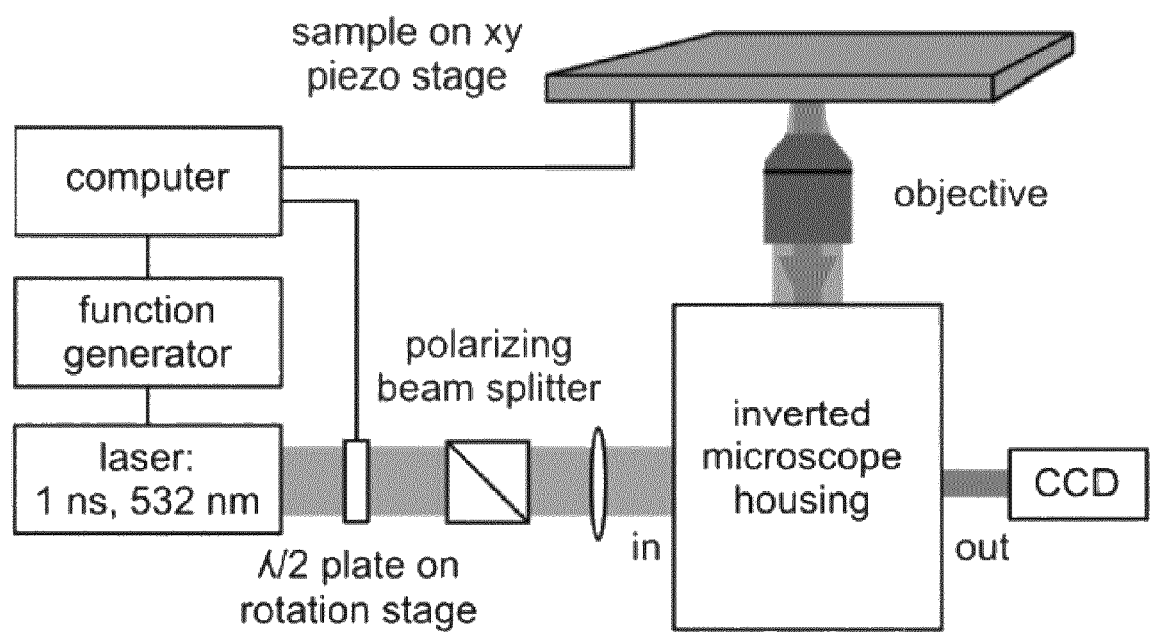
FIG. 6 shows the optical setup for laser colour printing.

Regarding the optical set-ups. The optical setup for laser colour printing is schematically illustrated in FIG. 6. It comprises a Nikon Ti—U inverted microscope where a laser (CryLaS FDSS532-150) emitting 1 ns pulses at 532 nm is used for printing. The laser pulse energy is controlled with a half wave plate on a computer controlled rotation stage combined with a polarizing beam splitter. The laser beam is focused onto the input port of a module of the microscope that is made to accept fiber-coupled laser input sources for diffraction-limited focusing onto the sample. A white light source can be coupled in for illumination as well (not shown in the figure). In this work, the sample was mounted on a computer controlled piezo nanopositioning stage (Mad City Labs Nano H50 series piezo electric stage, 0.1 nm resolution, 50 μm travel, XY axes), which was placed on a computer controlled motor stage. A Matlab code was used to switch the laser on and off via a function generator, the laser energy via the half wave plate and the polarizing beam splitter, and the piezo/motor stages for laser printing of images in a raster scan.

In the examples, the incident intensity for changing the geometry of the second plurality of plasmonic structures is generally approximately within 5% to 10% of an incident intensity required to melt a film of a corresponding material and a corresponding thickness as the plasmonic structures within the second plurality of plasmonic structures.

Figure 7:
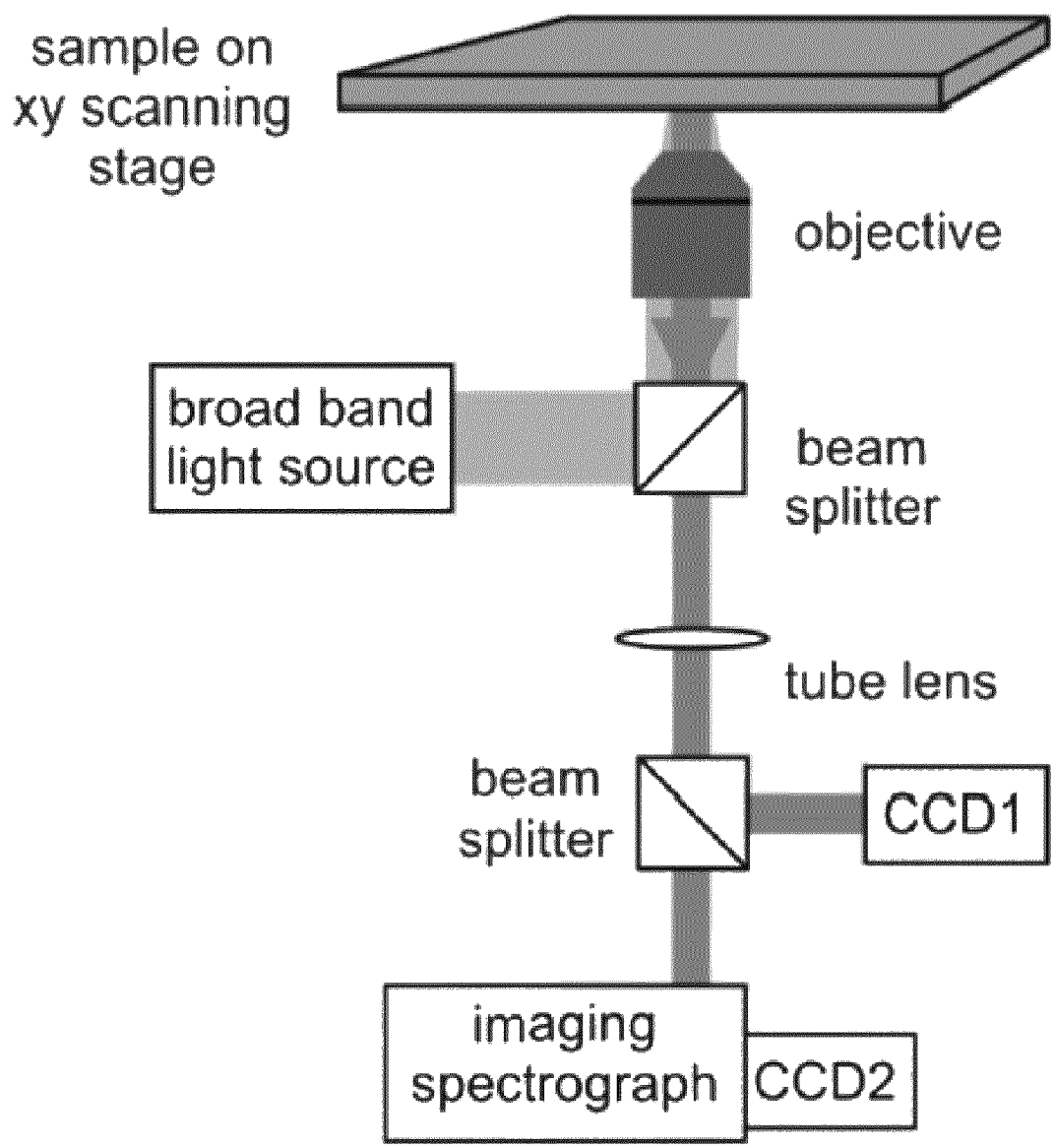
FIG. 7 shows the optical setup for spectroscopic imaging.

The optical setup for spectroscopic imaging is illustrated in FIG. 7. A high intensity white light source (Energetiq EQ-99XFC fiber coupled laser driven light source) is used for illumination. An image of the surface is projected onto the control CCD array, CCD1. Via a beam splitter, a duplicated image of the device surface is projected onto the entrance slit of an imaging spectrometer with a 150 g/mm grating (Acton SP-2756 imaging spectrograph with PIXIS100B digital CCD camera, 100×1340 pixels, CCD2). This way the image of the sample is spectrally resolved with a resolution of 0.17 nm and at the same time spatially resolved on a line with a resolution of the diffraction limit up to 0.25 μm, however crosstalk between adjacent lines cannot be avoid for longer wavelength whose limit is larger than 0.25 μm. However, it is possible to enlarge the steps (e.g., 500 nm/step) in the direction parallel with this slit.

Results

The concept of the laser printer introduced by the present inventors is illustrated in FIG. 1. The printable "paper" utilizes a plasmonic metasurface with metal disks on top of dielectric pillars and hovering above a holey metal film, see FIG. 1a. This design with pillars can be implemented by nanoimprint, roll-to-roll and inject moulding technologies with a negative master defined by E-beam lithography (EBL). The inventors explore abundant and recyclable aluminium (Al) as the plasmonic material, which is with higher plasma frequency and has recently been studied to yield surface plasmon resonances (SPRs) from visible to UV. Due to plasmon hybridization of the disk-hole system in the Al metasurface, reflected colours caused by resonant absorption at specific wavelengths can be easily modified by the geometric parameters. The SEM image of a small area of the metasurface is shown in FIG. 1b.

Figure 1B:
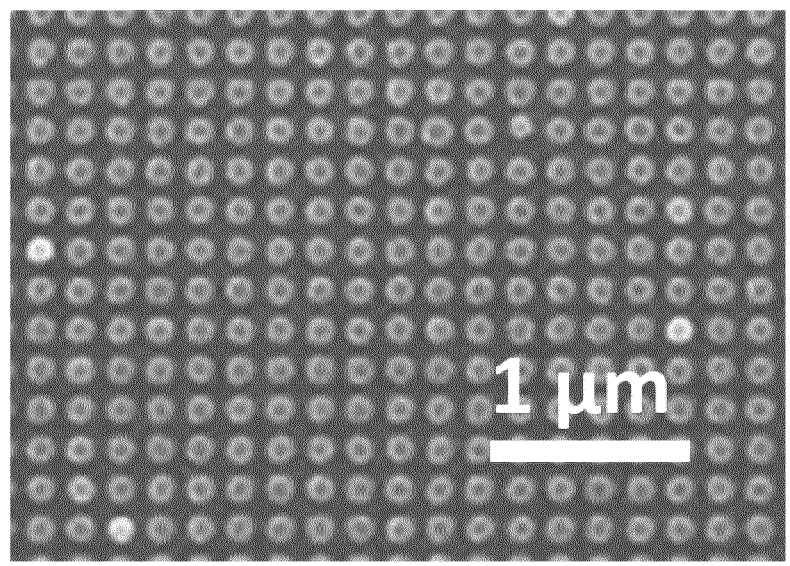
FIG. 1b shows a top-view SEM image of a plasmonic metasurface.
Figure 1C:
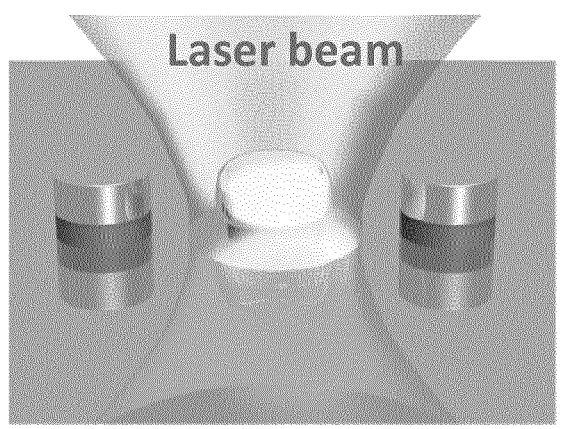
FIG. 1c shows a schematic illustration of the laser printing mechanism.
Figure 1D:
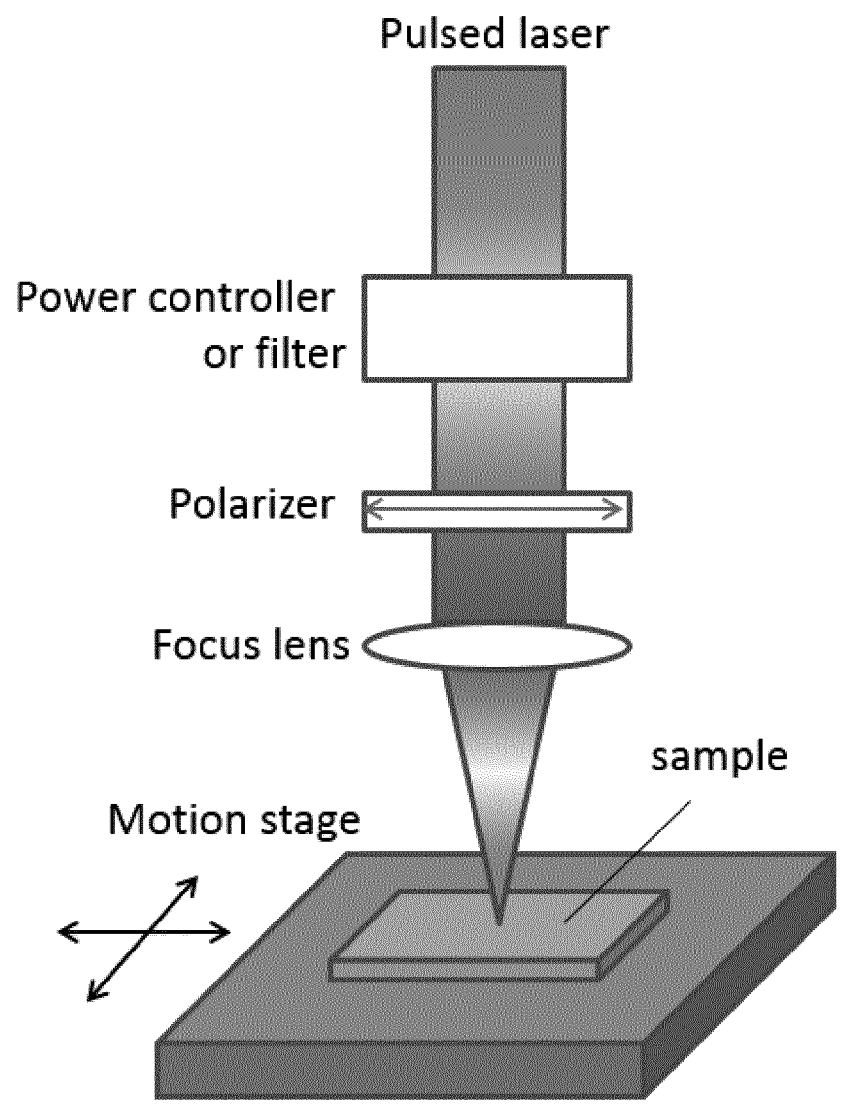
FIG. 1d shows a setup of a plasmonic true-colour laser printer.

For a laser pulse of nanoseconds duration, the instantaneous energy is sufficiently high and the selected area will heat up to above the threshold temperature of melting, and in a process with complex rheology they may thus transform their shape (FIG. 1c). By the excitation of SPR with electric field confinement, light energy is redistributed and concentrated in specific regions of the disk-hole unit cell, leading to a fine tuning of the morphology by manipulating the input photon power. In turn, the morphology changing will shift the resonant frequency of SPR and with a resulting variation in the reflected colour. This paves the way to patterned colour printing by controlling the laser parameters (such as power, spot size, frequency, polarization etc.) as well as the position of the laser spot (FIG. 1d).

Figure 2A:
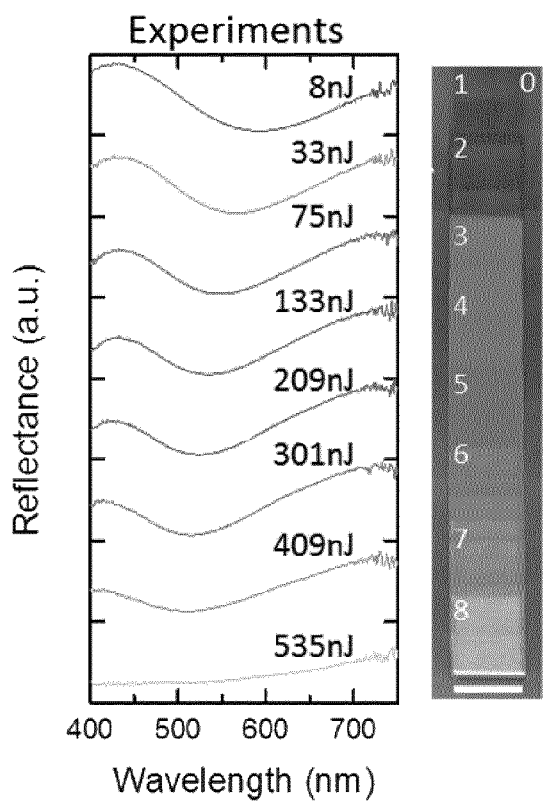
FIG. 2a, left, shows experimental spectra of metasurface, and, right, corresponding printed squares.
Figure 2B:
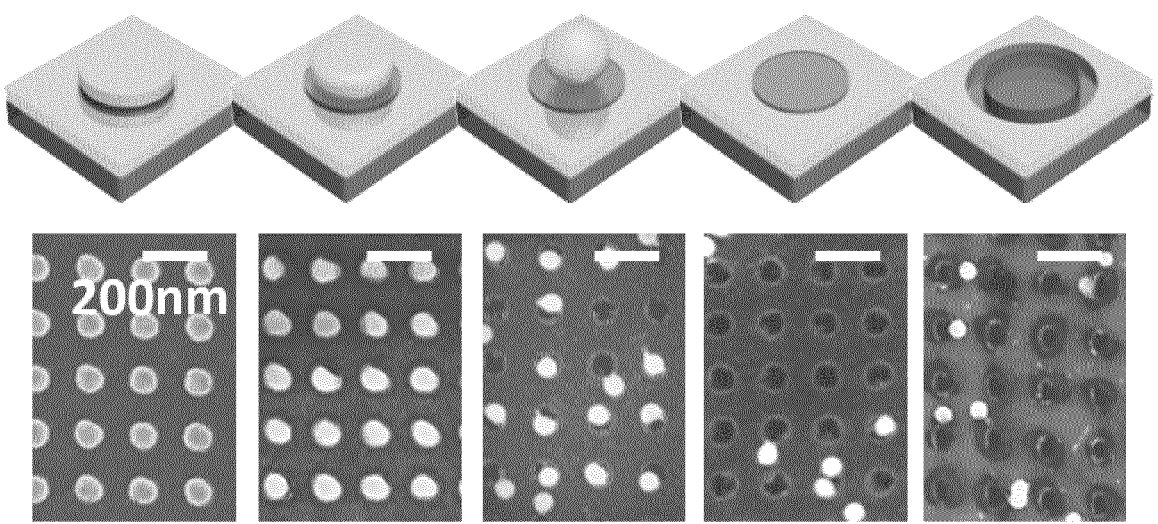
FIG. 2b, lower portion, shows SEM images of irradiation with a single ns laser pulse, and, FIG. 2b, upper portion, shows the related 3D illustrations of the morphology developing.

To obtain a desired colour from laser irradiation, the present inventors show the SPR and colour change of a sample through single-pulse laser exposure (1 ns, =532 nm). As the input laser dosage is increased in the focal plane of a 4 objective (spot size: 50 m in diameter), the main SPR shifts from 600 nm to 400 nm and the printed colour varies from blue to yellow (FIG. 2a). The continuous tuning of colours across the visible spectrum may be realized in metasurfaces with different parameters, e.g., hole-disk plasmonic structures with varying diameter, such as from D=82 nm to D=124 nm, or such as geometrically modifying to various degrees by modifying dosage of electromagnetic radiation, such as laser dosage. FIG. 2b shows SEM images where the pulse energy at the center is different, as well as the related 3D illustrations of the morphology revolution (the right column of FIG. 2b). The inventors find that with sufficient laser intensity, the Al nanodisks can be annealed at the their rims and evolved into spherically shaped objects, as illustrated in FIG. 2b. It is also seen that when the inventors increased the laser intensity, the spheres were kind of propelled and spilled out from the polymer interface, owing to a rapid change in the center of mass during the melting process, providing the particles with a repulsion momentum. For a laser energy above 500 nJ, even the underneath holes can be enlarged, as shown in the last SEM image in FIG. 2b.

To imitate the morphology transformation of the Al disks, the inventors offer a simplified description of the complex thermodynamic phase transition without considering the gravity and just verify the thickness t of round-cornered disks (or the radius r of the sphere) while preserving the over-all metal volume (the volume of initial disks). Simulations in FIG. 2c clarify the blueshift of SPR and demonstrate a qualitative agreement with the corresponding measurements for different thermo-transition states. FIG. 2d demonstrates the simulated electric field enhancement for printed metasurfaces. Here, all the top elements are simply centered and overhead of the holes, but the could in alternative embodiments have been off-centered, since the position of the top element in the unitcell will not significantly alter the spectral response (such as even if the center of the disk being substantially above the edge of the hole). The electric field decreases during the gradual transformation of nanodisk into sphere-like nanoparticles: the field is strongly localized at the sharp corners in (i), dissipating in (ii) and dispersively covering around the sphere in (iii). The absorbed power of heat is directly related to the electric field distributed in the materials and can be simply described as $$Q_{abs}(\omega) = \tfrac{1}{2}\omega \int \varepsilon''(\omega)|E(\omega)|^2 dV$$

where ω is the angular frequency, ε"(ω) is the imaginary part of the dielectric function, E is the electric field, and the integration is carried out over the volume. The heat absorption can obviously be improved by overlapping the lossy metal with a strong electric field. With the aid of the SPR, the electrical field is strongly localized and enhanced near the metal surface and exponentially decays into the surrounding medium, causing a strong heat power confined at the interface. This process can be further understood by examining the temperature distribution and heat power losses resulting from thermoplasmonic heating.

The theoretical relaxation time $\tau$ of heat can be estimated as $\tau \sim L^2/\alpha$, where $\alpha$ is the thermal diffusivity. Considering the thermal diffusivity of Al ($6.9 \times 10^{-5}$ m$^2$/s). the inventors estimate that heat can spread as far as hundreds of nanometers in 1 ns, which is efficient for melting an isolated disk with a diameter of 100 nm. Thus, the presently presented spot-by-spot printing technique is fully compatible with existing drive technology, and allows printing speeds up to 1 Gbit/s when using a high repetition rate laser source. Furthermore, note that the thermal conductivity of polymers is always two orders lower than that of metals. If we further consider the negligible imaginary part of polymers and the insignificant field inside, the polymeric substrate can not absorb much heat energy, since the thermodynamic phase transition of its metal neighbour will consume almost all of the energy and decrease the temperature in a short time, leading to a recrystallization into a spherical shape by surface tension.

Figure 3A:
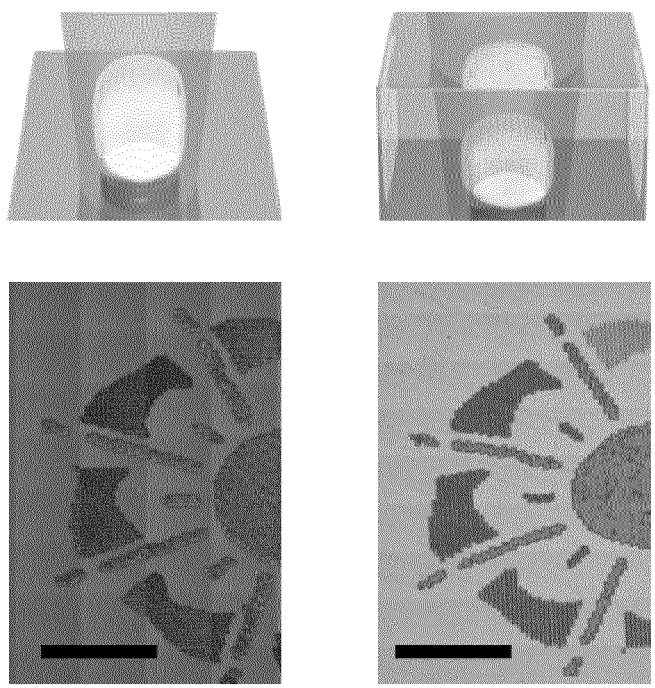
FIG. 3a shows illustrations and exemplary results of laser printing on samples.
Figure 3B:
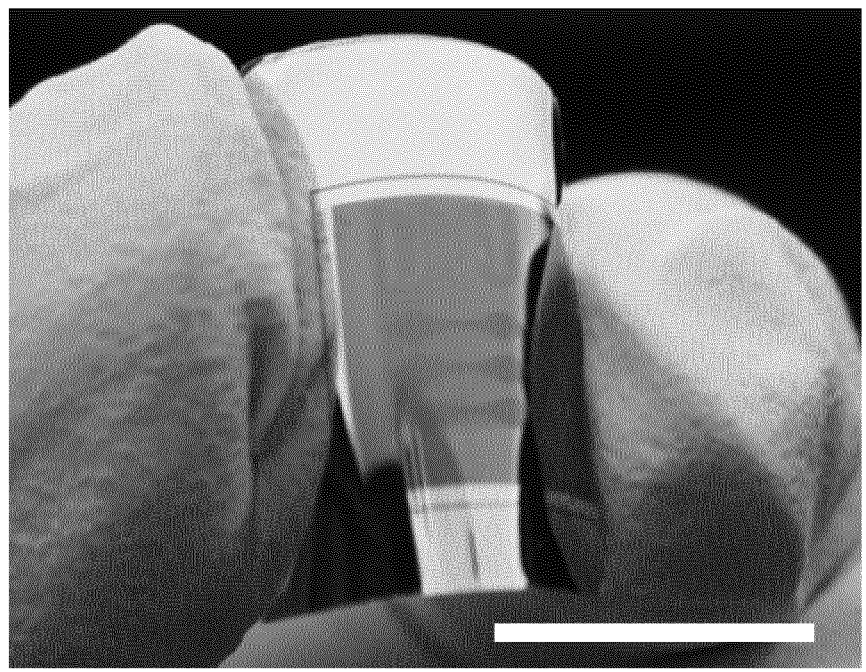
FIG. 3b shows a large-scale sample with plasmonic colours in RGB tone.

Based on the above trait of local heating, the plasmonic elements can be embedded in transparent polymers for laser printing. With the excitation of the SPR, the plasmon enhanced photo-thermal melting ensures that the writing process only takes place at the plasmonic metasurface within the focal plane. It provides the ability to record three-dimensionally for imprinted and stacked metasurfaces in a matrix, such as a polymeric matrix. As shown in FIG. 3a, a PMMA layer is spin-coated with a thickness significantly large to avoid Fabry-Perot interference. This coating causes an increase in the effective refractive index surrounding the plasmonic metasurface, which leads to a redshift of the resonances in the system and a corresponding colour change before and after laser printing. The top coating offers an advantage to protect the structure from mechanical damage, fingerprints, greasy residue, and so forth, making the proposed "paper" more robust and fully flexible for colour printing in everyday applications, as shown in FIG. 3b, the inventors demonstration of a printed logo with RGB colours.

For a detailed expression of a colour image, it may be advantageous to not only produce single colour depth, but also colour mixing or overlapping, to broaden the capability of the available colour library. For a proof-of-concept demonstration, spatial colour mixing can be achieved by coordinating the distribution of colour dots. By controlling the laser spot size and step dimension, the inventors print pink colour dots onto the blue background with different filling factors. For the spot size well below the resolution of a regular human eye so that spatially distributed dots can be seen as a single mixed colour (FIG. 3c). In FIG. 3e the inventors find that simple averaging of two different colour spectra shows a similar result as the reflection spectrum of the mixed colour, proving the spatial mixing of distinct structural colours. Despite the practical advantages of laser manipulating, colour generation by spatial mixing as a complementary strategy is ultimately advantageous in order to accomplish full-colour printing.

Figure 4A:
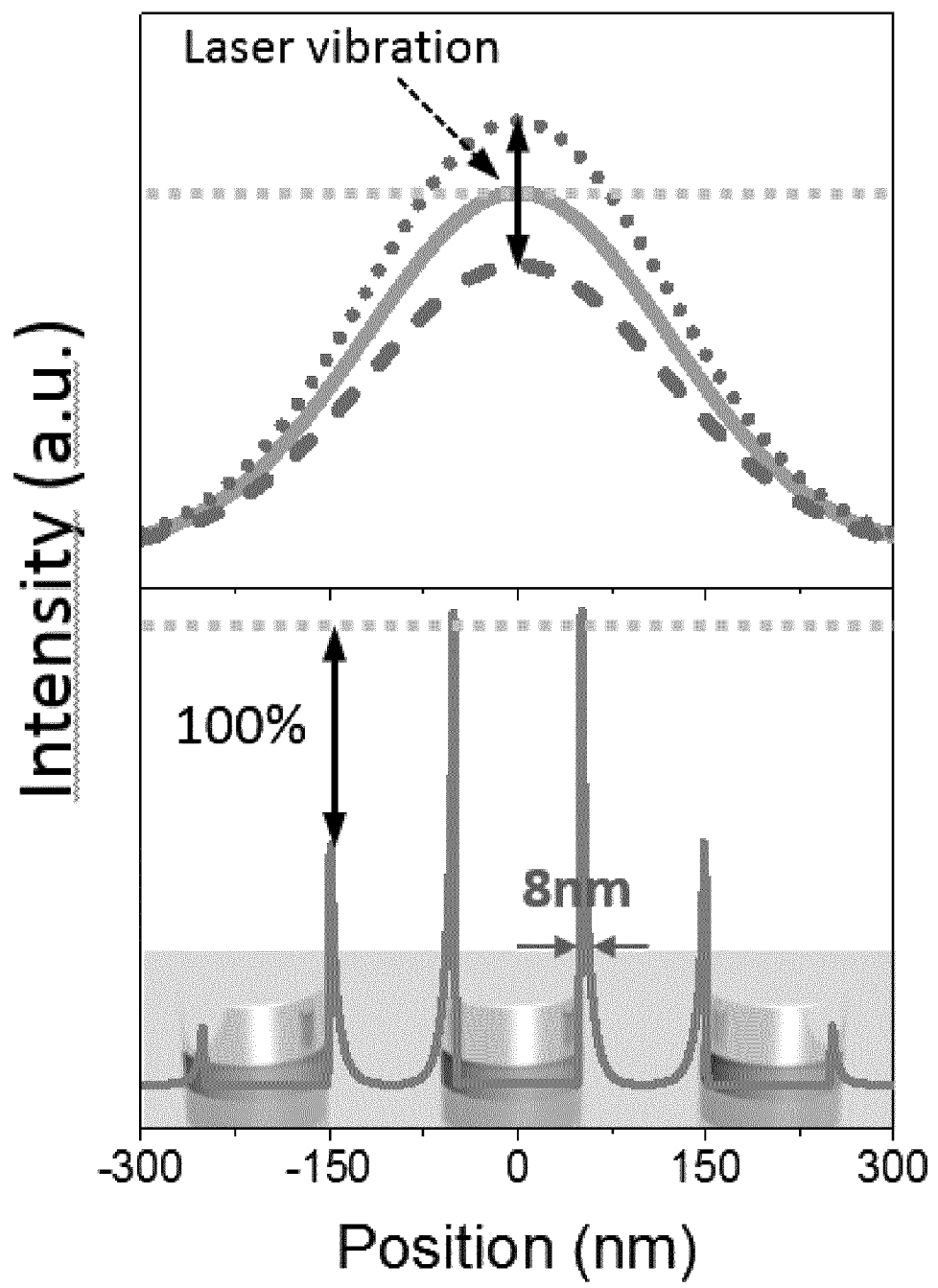
FIG. 4a shows upper, sub-diffraction-limit laser printing without plasmonic reconfiguration.

The inventors further show how to increase the printing resolution to exceed the diffraction limit. Photon heating occurred only in the vicinity of the focal spot and the size of melted material can be reduced because of the Gaussian probability distribution on the photon fluence density: melting reactions were not initiated and propagated if the exposure energy density was less than a critical value. This property defined a threshold and excluded the low-intensity wings from melting and thus reduced the size, as shown in the upper panel in FIG. 4a. Although the limit of focal-spot size is a measure of the limit of Rayleigh diffraction (e.g., hundreds of nanometers), it does not seem to impose any constraint on the actual structure size due to photon-induced melting (FIG. 4a). However, a small (e.g. 10%) fluctuation of the laser intensity would be detrimental for this mechanism. On the other hand, to reach the critical temperature (namely, 933.5K) for melting Al, the high-power laser is the only option. Laser research and applications often face the trade-off between laser's stability and intensity. Here, the inventors show that this common dilemma has no serious impact on the presently presented surface-plasmon-reenactment of the threshold criteria.

Sub-diffraction-limited optical resolution is a desire both in imaging and recording. Surface plasmons possess two natural properties of subwavelength light confinement and intense field enhancement. Using a plasmonic superlens, sub-diffraction-limited imaging with 60 nanometer half-pitch resolution has been demonstrated. The inventors have pushed optical image recording to the potential 20 nm scale by exploiting the plasmonic thermal reshaping. As shown in the lower panel in FIG. 4a, photon energy is redistributed with optical field confinement and enhancement by the plasmonic metasurface. This field redistribution is the key to successfully realizing (1) a higher spatial resolution, that the melting localizes to the single unit cell and the annealing can be well controlled under sub-20 nm dimensions, (2) a better stability tolerance, that a more than 100% vibration can be endured before the nearest neighbouring unit cell reaches its threshold of melting, and (3) a lower laser power, that reduction to the 1% level in laser power is feasible owing to the 100 times enhancement of the field intensity by the SPR.

The inventors were thus able to design laser printed colour pixels of any small size by choosing an appropriate but relatively low laser-pulse energy, because only the region with energy above the threshold value was modified. To strengthen the conclusion, the inventors used a single nanosecond laser pulse focused through 40 objective lens (rather than 100) for printing. As shown in FIG. 4b, the inventors achieved the laser printing at the single unit cell level of the metasurface with a periodicity of 200 nm (that is, smaller than the theoretical diffraction limit throughout the entire visible spectrum). Furthermore, the effective printing (melting) part can be much smaller, which is less than 50 nm when using a single-pulse energy on spot down to 0.3 nJ (the inset in FIG. 4b), resulting in the laser-induced manipulation of structures within the single unit cell of the metasurface. The specific area (red dashed circle) is enlarged and presented to show that the effective reshaping part is as small as 40% of the disks, which is less than 50 nm. However, this is still not the optimal resolution by recalling the SEM image of states 2 in FIG. 2b.

As the plasmonic heating rubbed off the sharp corners from the disk-hole system and eliminated the narrow nanogaps in between, the electromagnetic field enhancement is consequently weakened. The gradient change of geometry and attenuation of intensity actually protected the printing area from multi pulse irradiation: the first pulse degraded the geometry immediately, making the field intensity from subsequent pulses below the threshold value. Moreover, the 50% intensity gap between these transition states of morphologies provides distinct power steps for reshaping, which is the guarantee for easier colour switching, mixing and overlapping.

To illustrate the creation of arbitrary images with colour and tonal control, the inventors printed a single image using a single nanosecond laser pulse focused through a 0.8 numerical aperture (NA) 50 objective lens. In order to prove the ultimate capability, the inventors used a colour design in blue tone (with the minimal diffraction limit among visible light) and a step size of 200 nm (the same dimension as the unit cell). The printed image was observed by an optical microscope with a 0.9NA 100× objective lens objective. As the pixel was at the theoretical resolution limit of the optical microscope, printed pixels can only be distinguished in a blurred way. In FIG. 4e the inventors show laser prints of images in different colours. The patterning was also conducted using a single nanosecond laser pulse per pixel at a step size of 200 nm. Although the inventors used a controlled laser power for patterning, the printing can also be performed with up to 5 colours with the optimal resolution that the images presented in FIGS. 4d and 4e with about 125,000 pixels in total would in principle fit into the cross-section of a human hair. Note that the image can also be laser-printed through a spatial light modulator (SLM) or a mask, which would allow a faster printing with a resolution approaching the single-unit-cell limit by following the achievements in this work.

With the multicolour printing on plastic-based plasmonic metasurfaces, the multi-nary code recording can be performed, paving the way for a low-cost recording apparatus. Using this technique, improved security imprinting and encryption can also be realized. The deep subwavelength nature of SPR made the recording of spectra for averaged areas with a vertical spatial resolution approaching the diffraction limit of 250 nm. By incorporation of subwavelength recording and multi-nary plasmonic colour channels, a print spacing equal to the bit diameter of 200 nm with a 4 colour channels results in a disk capacity of TB level for a DVD sized disk with a single layer of metasurface.

FIG. 1: Structures of samples and the laser printer.

FIG. 1*a* shows a schematic illustration of the sample structure. Abundant polymers suitable for nanoimprinting can be used for fabricating the samples. For instance, PMMA (Polymethylmethacrylat) or Ormocomp® (Micro resist technology GmbH) are good candidates, which can be imprinted in hot embossing (PMMA) or UV curing (Ormocomp®) processes. Here, the inventors chose the Ormocomp® as the substrate material and PMMA as the top coating further showing a flexible selectivity of materials.

FIG. 1*b* shows a top-view SEM image of a plasmonic metasurface. Scale bar 1 µm.

FIG. 1*c* shows a schematic illustration of the laser printing mechanism. The printing is governed by photothermal reshaping of the metasurface morphology at the focal plane of the laser spot; the morphology change is highly controllable in terms of incident laser power.

FIG. 1*d* shows a setup of a plasmonic true-colour laser printer. Laser exposure controlled by a digital power modulator combined with a synchronous motional stage allows the fast production of colour patterns.

FIG. 2 shows spectral and geometry analyses for photothermal reshaping of the metasurface.

FIG. 2*a*, Left, shows experimental spectra of metasurface with a selected diameter of nanodisks, D=106 nm. The dips aroused by SPRs blueshift with increasing dosage of the laser irradiation from 0 to 535 nJ.

FIG. 2*a*, Right, shows corresponding printed squares of 500 µm×500 µm each and with a 10 µm spot size show colour revolution from blue to pink till golden yellow. Scale bar: 500 µm.

FIG. 2*b*, lower portion, shows SEM images of irradiation with a single ns laser pulse. Pulse energy at the centre is 0 (unexposed), 33, 133, 301 and 535 nJ, corresponding to the colour area of Label 0, 2, 4, 6 and 8 in FIG. 2*a*, respectively. Scale bar: 200 nm. FIG. 2*b*, upper portion, shows the related 3D illustrations of the morphology developing.

Figure 2C:
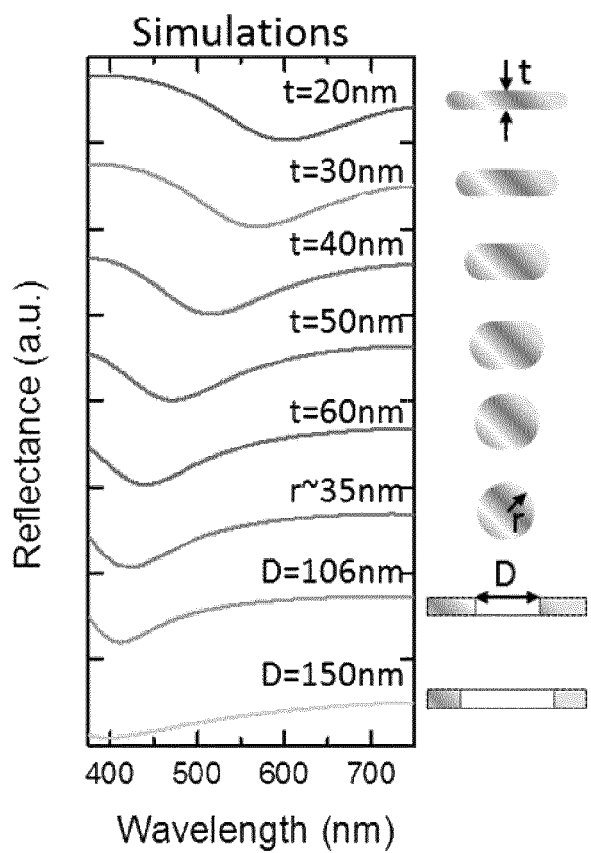
FIG. 2c shows simulated spectra in order to imitate the morphology transformation in measurements.
Figure 2D:
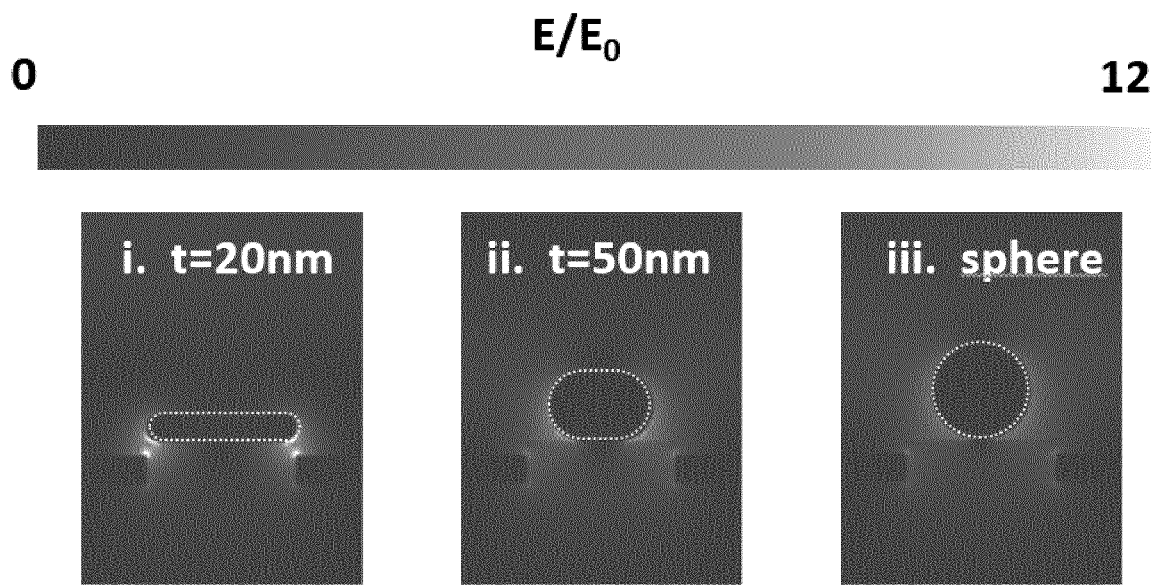
FIG. 2d shows simulated electric field enhancement for selected states of metasurfaces.

FIG. 2*c* shows simulated spectra in order to imitate the morphology transformation in measurements. The corresponding cross-section illustrations of the morphology revolutions in the right panel indicate the parameter settings.

FIG. 2*d* shows simulated electric field enhancement (at wavelength $\lambda$=532 nm) for selected states of metasurfaces (i) thickness t=20 nm, (ii) thickness t=50 nm and (iii) radius r=35 nm (sphere) after photothermal reshaping. Thickness is understood to be measured in a direction being parallel to incident radiation, which in the present figures would be from the top of the figure vertically towards the bottom of the figure in the plane of the paper.

FIG. 3 shows flexible and robust samples for laser printing and a colour mixing demonstration.

FIG. 3*a* shows illustrations and examplary results of laser printing on samples without (left) and with (right) polymer coating. The coating leads to a redshift of the resonances in the system and a corresponding colour change before and after laser printing because of the increased refractive index surrounding the plasmonic metasurfaces, which are clearly shown in the microscope photos with different printed colour results but under a same laser power configuration. Scale bars: 500 µm.

FIG. 3*b* shows a large-scale sample with plasmonic colours in RGB tone printed by laser pulse transmitted through the topside protecting polymer. Scale bar: 1 cm. This reveals that the inventors propose a robust and flexible solution for colour printing in everyday usage, which can keep away from mechanical damage, fingerprints, greasy residue, and so forth, which thus provides a "paper" being superior to the well-known fiber based, such as wood-based paper.

FIG. 3*c* shows a printed portrait of "Mona Lisa" which is photographed by a camera with Macro-lens. Scale bar: 2 mm. The square in the portrait denotes the magnified area in FIG. 3*d*.

Figure 3D:
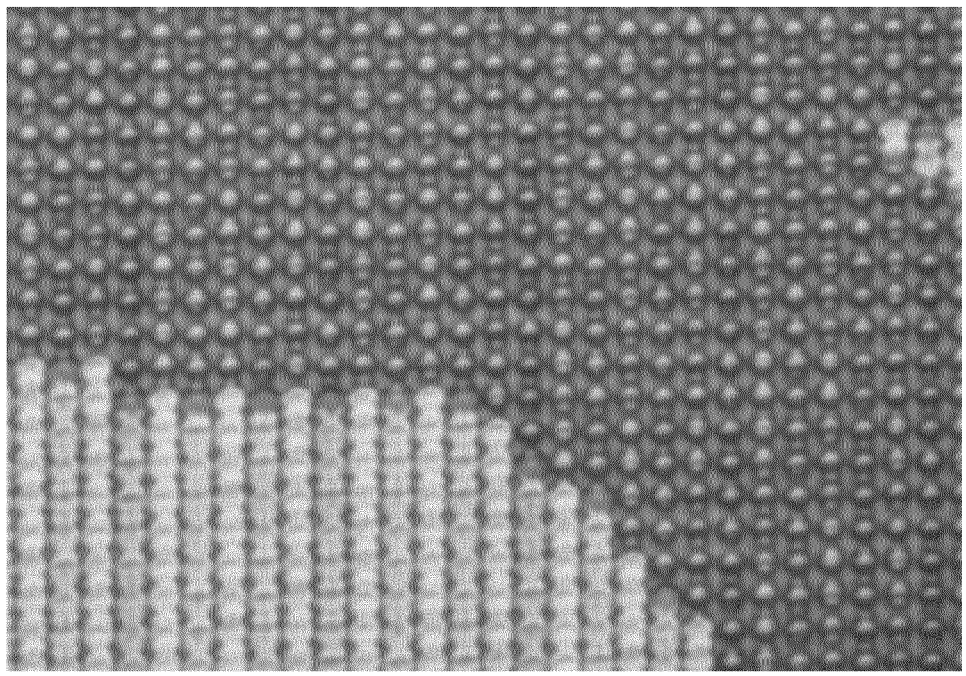
FIG. 3d shows the magnified area corresponding to the square in the portrait in FIG. 3c.
Figure 3C:
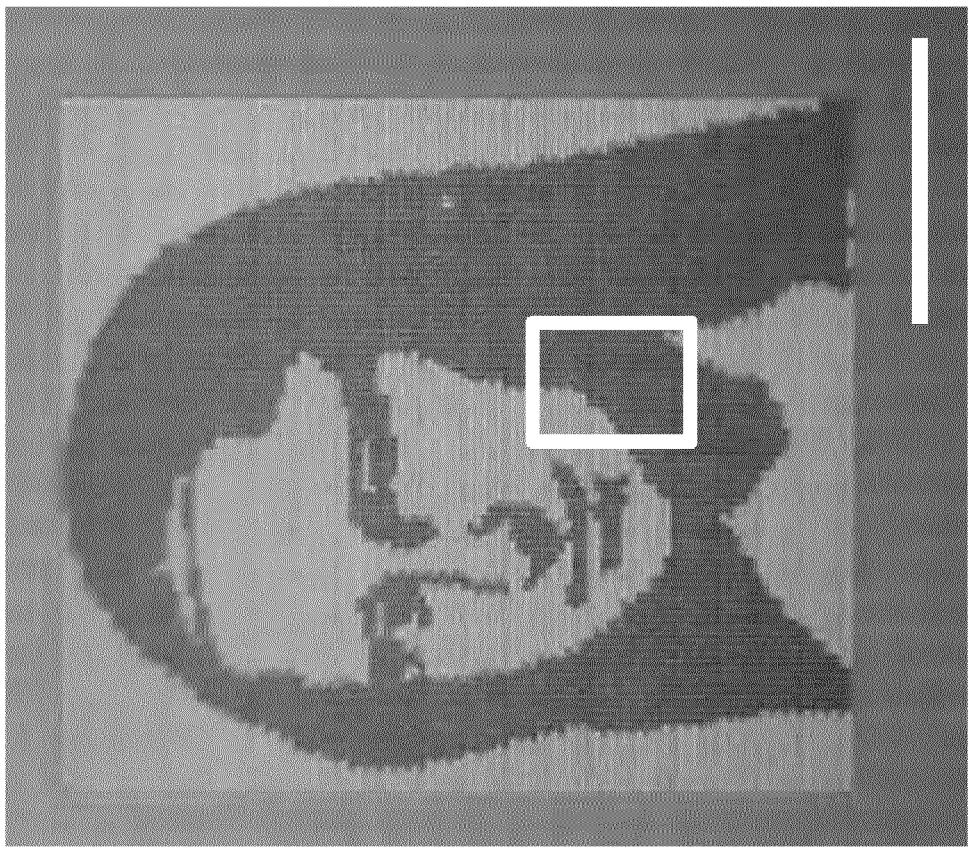
FIG. 3c shows a printed portrait of "Mona Lisa".
Figure 3E:
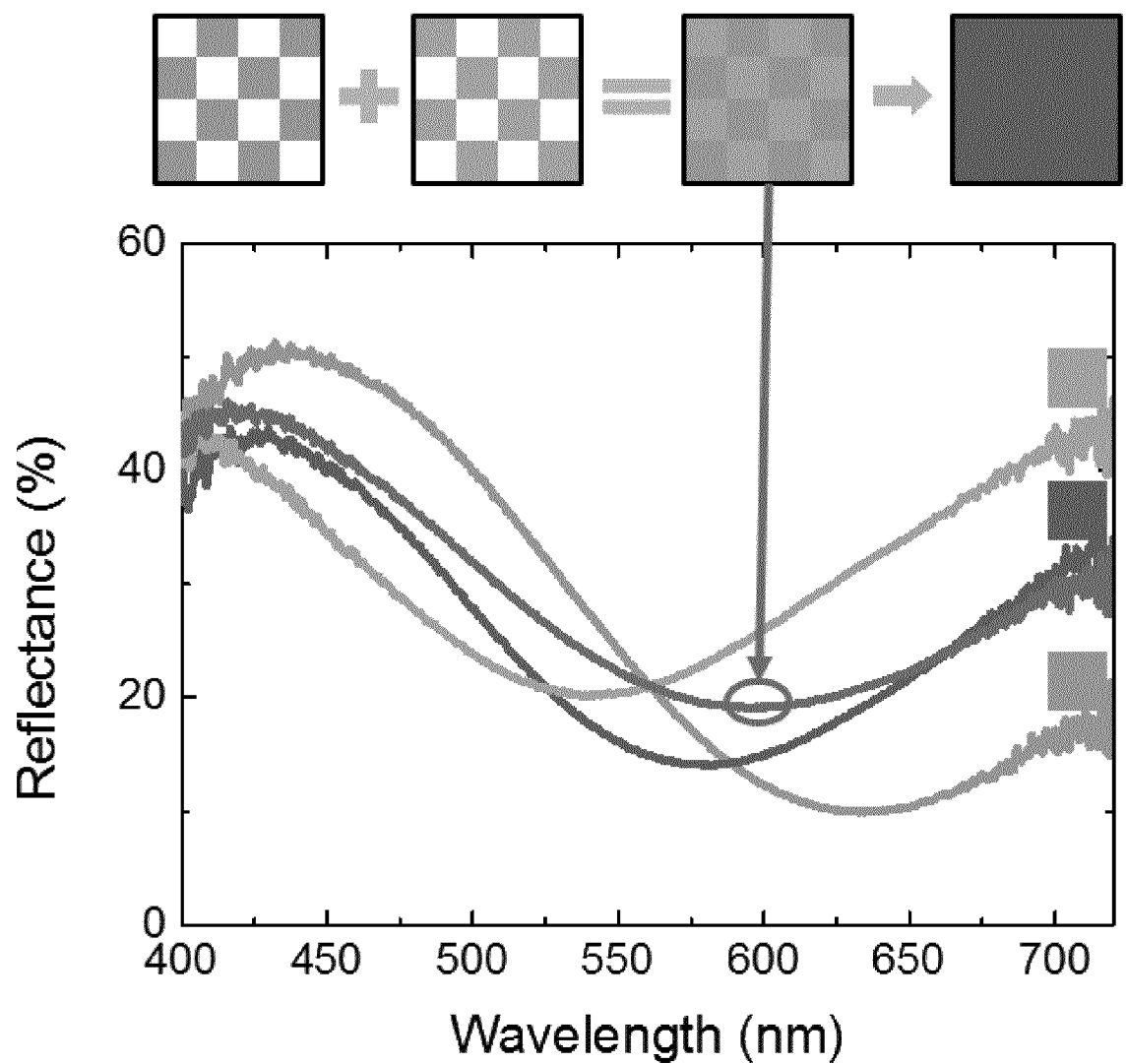
FIG. 3e shows corresponding reflectance spectra of selected pixels with different colours.

FIG. 3*d* shows a magnified area (corresponding to the square in the portrait in FIG. 3*c*) by a microscopy shows colour dots with different dimensions. Scale bar: 500 µm. The inventors find that quantized dot arrays (pink) against the background (light blue) can be seen as a single mixed colour (dark blue) in the macro-image when their size is unresolvable for the human eye.

FIG. 3*e* shows corresponding reflectance spectra of selected pixels with different colours, the background blue colour, the printed pink colour and the mixed colour. A simple averaging of the first two colour spectra shows a good agreement with the one of the mixed colour pixel, proving a successful spatial mixing of the distinct structural colours. In principle, the inventors can get a full-colour library by combining the already-rich colours (caused by laser reshaping directly) and the additional colour mixing possibilities.

Figure 8:
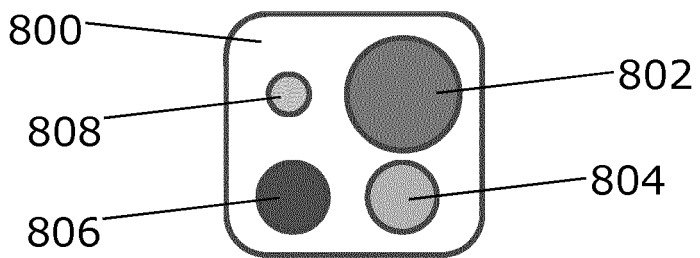
FIG. 8 is a schematic showing the principle of colour mixing.

FIG. 8 is a schematic showing the principle of colour mixing. In an area 800 which is equal to or smaller than the resolution of the human eye, there is placed a plurality of plasmonic structures which have different optical properties, such as colours, with respect to each other, and where the limited resolution of the human eye entails that the perceived colour in the area is a colour mixed from colours of the plasmonic structures, such as a mixture of a blue plasmonic structure 802, a green plasmonic structure 804, a red plasmonic structure 806 and a yellow plasmonic structure 808. Thus, it is possible to use a laser to modify the plasmonic structures individually, and thereby generate all primary colours for colour mixing.

Figure 9:
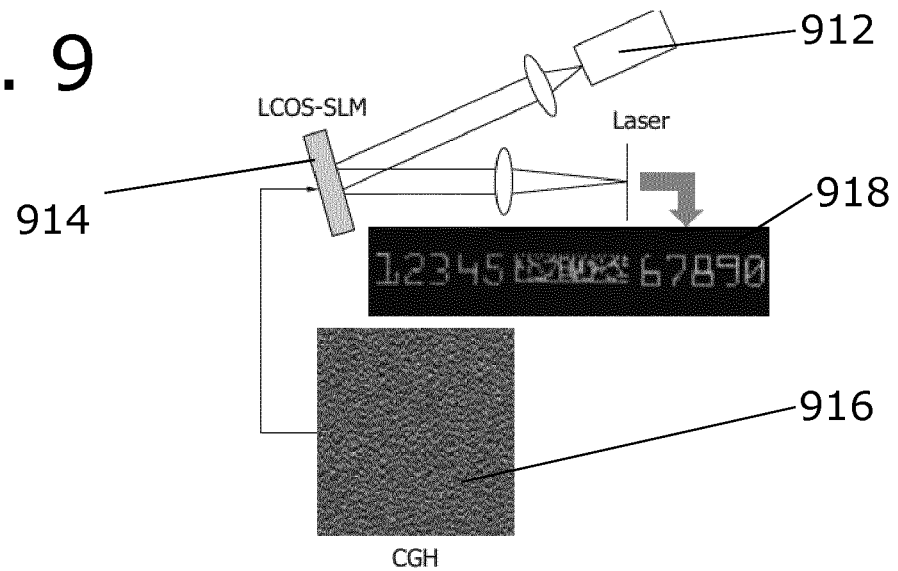
FIG. 9 shows an optical setup for printing with an image.

FIG. 9 shows an optical setup for printing with an image. It may be advantageous to print an entire pattern at once, i.e., to dispense with the need for, e.g., printing sequentially, such as raster printing. The setup in FIG. 9 features a laser 912 and a spatial light modulator 914 for laser writing. A spatial light modulator (SLM) is an object that imposes some form of spatially varying modulation on a beam of light. A simple example is an overhead projector transparency. It may be understood that the transparency or reflectance can be controlled by a computer. In the present example, an SLM (LCOS-SLM X10468-04) can be fully controlled by a personal computer. Any desired light intensity distribution can be generated by controlling the diffraction and interference of light by using the SUM. A phase distribution at the SLM that is calculated by a computer for generating the desired light intensity distribution 918 at the image plane is called computer generated hologram 916 (CGH). One of the applications of SLM is beam shaping. The beam shaping creates a light intensity distribution by passing (reflecting) or blocking light, as shown in FIG. 9.

Figure 10:
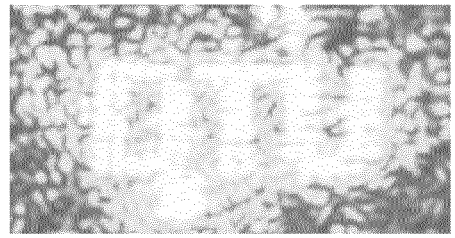
FIG. 10 shows the resulting pattern of a beam shaped LASER.
Figure 11:
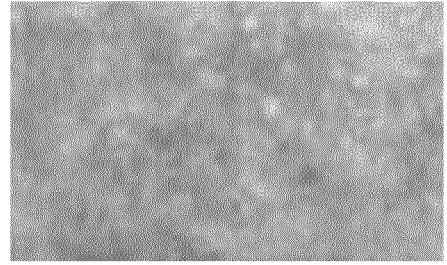
FIGS. 11-12 shows the resulting corresponding written structures.
Figure 12:
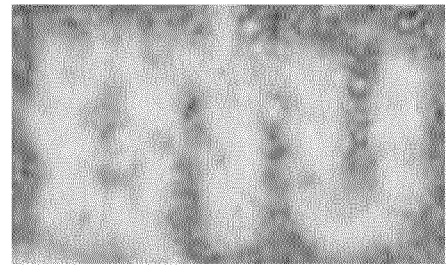

FIGS. 10-12 shows an image (FIG. 10) and a corresponding printed pattern (FIGS. 11-12). More particularly, shows a beam shaped pulsed laser with resulting pattern (FIG. 10) and the resulting corresponding written structures (FIGS. 11-12) with red color on the plasmonic metasurfaces. FIG. 11 is a colour image of the resulting corresponding written structures. FIG. 12 is the colour image in FIG. 11, which has been converted to a greyscale image where the grey-tone-intensity is based on the intensity in the red channel of FIG. 11. FIGS. 10-12 presents an example of beam shaping, which can be used for laser printing. A single shot of the pulsed laser can be distributed in space by a CGH (cf., the setup described in FIG. 9) with specific pattern and directly interact with a plasmonic metasurface (cf., FIG. 9), such as the plasmonic metasurface in this example being a support structure with a plurality of plasmonic structures, which is placed in the image plane. By applying this method, it is possible to do "serial writing" (as opposed to raster-writing). This may be advantageous due to the fast speed, in particular the fast speed for writing big patterns.

FIG. 4 shows achievement of sub-diffraction-limit resolution, physics and results.

FIG. 4*a* shows upper, sub-diffraction-limit laser printing without plasmonic reconfiguration, where dashed, solid and dotted lines respectively denote the laser-pulse energy below, at and above the metal melting threshold (dashed yellow line). Note that the dashed yellow line represents an intensity in the plane of the plasmonic structures required to melt a film of a corresponding material and a corresponding thickness as the plasmonic structures The upper sub-figure in FIG. 4*a* indicates that without the redistribution of energy provided by the plasmonic structures, the incident intensity has to exceed this threshold in order to reshape the structures. It presents that a small fluctuation of laser has a decisive influence of the resolution. Bottom, advanced sub-diffraction-limit resolution printing where photon energy is redistributed with optical field confinement and enhancement by the plasmonic metasurface. By comparing both methods, the inventors find that without the assistance of the plasmonic elements, the required laser power is relatively high and the stability tolerance is disastrously low, while a small vibration will destroy the accomplishment of sub-diffraction-limit resolution.

It may be understood, that in advantageous embodiments, the plasmonic structures in the first plurality of plasmonic structures may be arranged so that field enhancement in a section of the support structure with the plasmonic structures (such as in the lower part of FIG. 4*a*) presents peaks, which peaks have a width (such as full width at half of the maximum) being less than 100 nm, such as less than 75 nm, such as less than 50 nm, such as less than 25 nm, such as less than 20 nm, such as less than 10 nm, such as 8 nm or less. An advantage of this may be that it enables a high resolution. Narrow peaks in such field enhancement curve may be realized by having, e.g., disks and holes where narrow peaks are given at the edges of the disks.

It may be understood, that in advantageous embodiments, the plasmonic structures in the first set may enable electric field resonances. It may be understood, that in advantageous embodiments, the plasmonic structures in the first set may enable that the field enhancement primarily occurs at the edges or within the solid material of the plasmonic structures (where the solid material of the plasmonic structures is, e.g., the metal, such as the metal of the disks and/or the metal of the film wherein a hole may be considered a plasmonic structure), such as rather than having the field resonance being placed outside—such as between—solid material of the plasmonic structures (such as may be the case for gap plasmons).

FIG. 4*b* shows SEM image of voxels formed at exposure with laser-pulse energies, which is gradually decreased from the upper left corner to the bottom right one. Scale bar: 5 μm. The inset shows a magnification of the area with the red dashed circle (scale bar in the inset: 500 nm). It can be seen that a specific, selected single plasmonic structure may be partially melted, whereby a "morphology manipulating resolution" (i.e., the resolution with which the morphology or geometry) may be modified of as little as 20 nm is achieved.

Figure 4C:
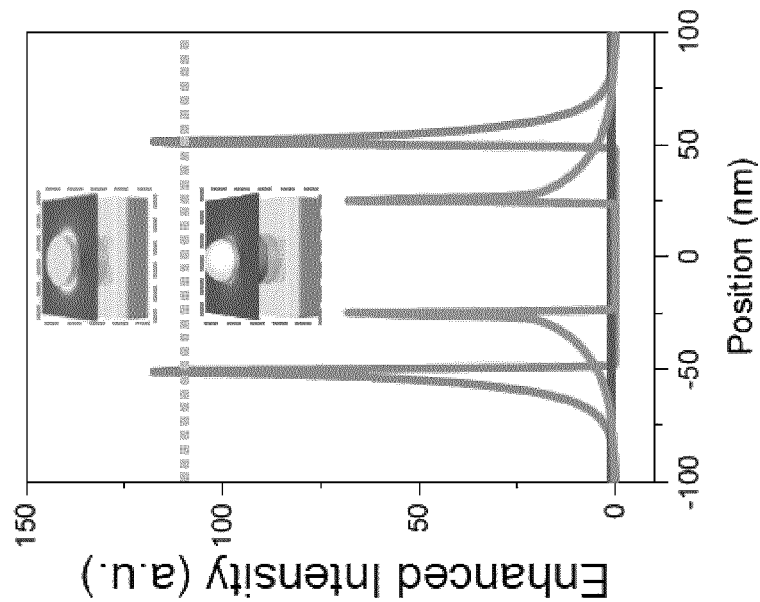
FIG. 4c shows the field enhancement of the printed unit cells with a disk and a sphere.
Figure 4B:
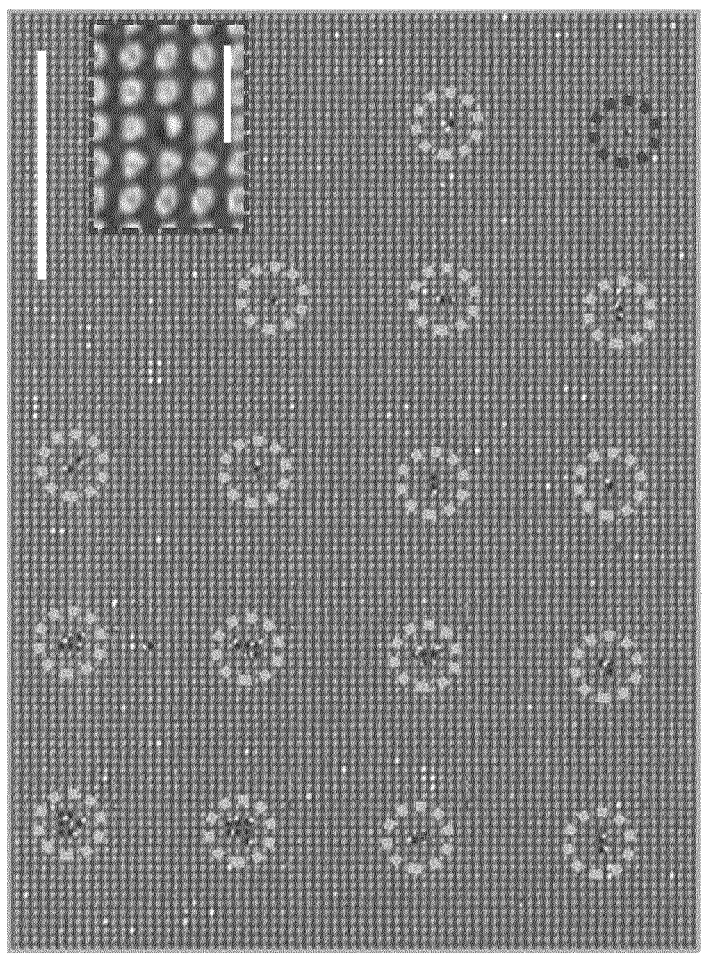
FIG. 4b shows SEM image of voxels formed at exposure with laser-pulse energies.

FIG. 4*c* shows the field enhancement (the horizontal section in the middle) of the printed unit cells with a disk and a sphere, respectively.

Figure 4D:
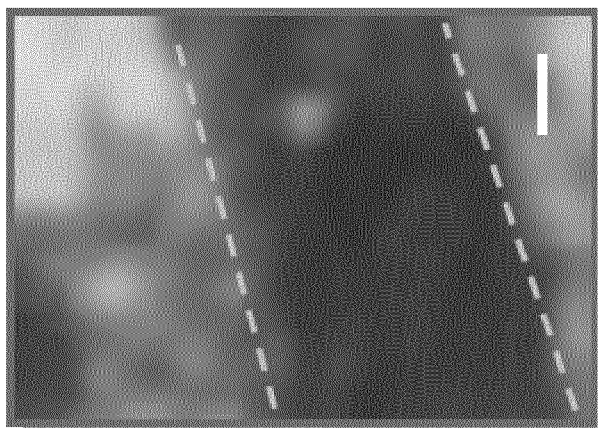
FIG. 4d shows a colour design in blue tone.
Figure 4D:
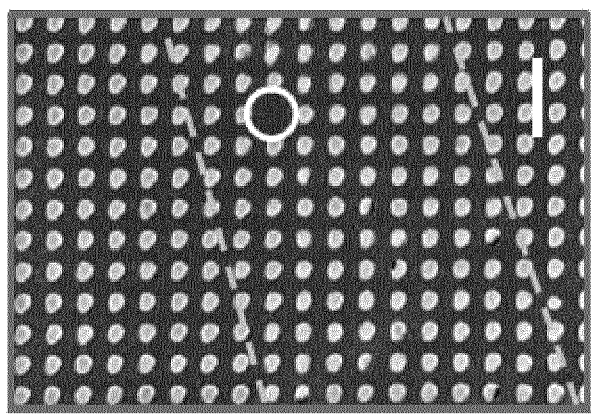
Figure 4D:
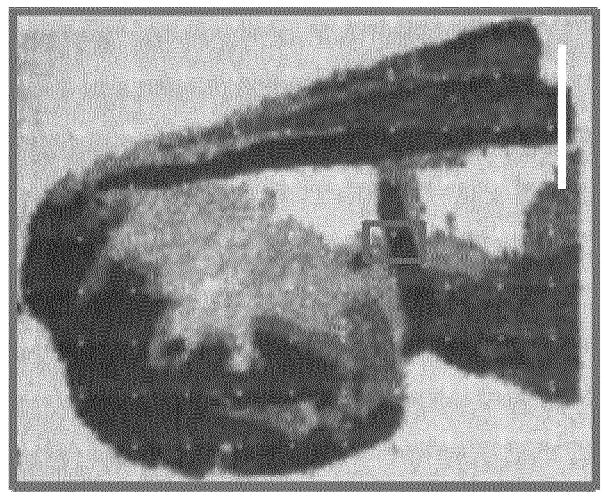
Figure 4E:
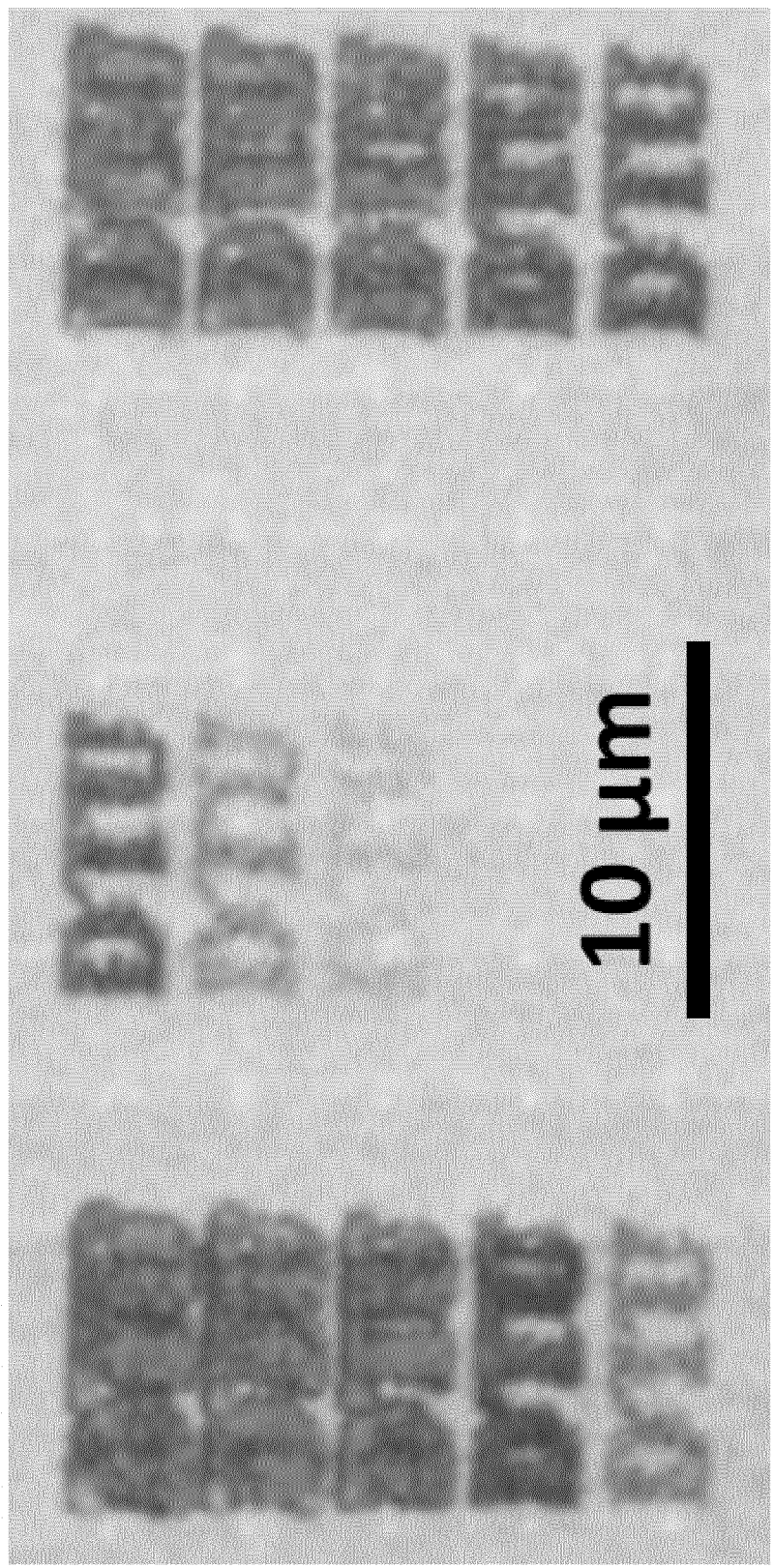
FIG. 4e shows printed images in different colour schemes.

FIG. 4*d* shows a colour design in blue tone (to achieve the minimal diffraction limit of 200 nm among visible light) with single unit cell printing resolution (Left). Scale bar: 10 μm. (Middle), SEM image and (Right) magnified picture of a selected area in (Right), showing the plasmonic metasurface after laser reshaping, scale bars: 500 nm. The bright white dot (the marks for alignment and locating, intentionally planted defects in EBL) that appears in (Left) and (Right) is labeled by a circle in (Middle). Dashed lines were superimposed to show boundaries between the different colors. Importantly, the structural reshaping with minimum energy is too fuzzy to be clearly visible and the printing trace of the blueish color is hardly to be perceived by human eyes, while notches in disks made by stronger input energy lead to a dark-red color. It should be pointed out that we can achieve the appeared multiple colors with a very small amount of laser power, which ensures the laser-melting reshaping in a highly controlled way, leading to a structure manipulating resolution of sub-20 nm.

FIG. 4*e* shows printed images in different colour schemes. The patterning was conducted using a single nanosecond laser pulse per pixel with a step size of 200 nm. The laser pulse energy used for patterning were moderated to minimize influence for different printing channels, while strong power will incite crosstalk of plasmonic energy distribution between the neighbouring unit cells and degrade the resolution. However, the controlled laser power still can perform printing of up to 5 colours, at the same time with the highest sharpness. Scale bar: 10 μm.

FIG. 6 shows the optical setup for laser colour printing.

FIG. 7 shows the optical setup for spectroscopic imaging.

Figure 5:
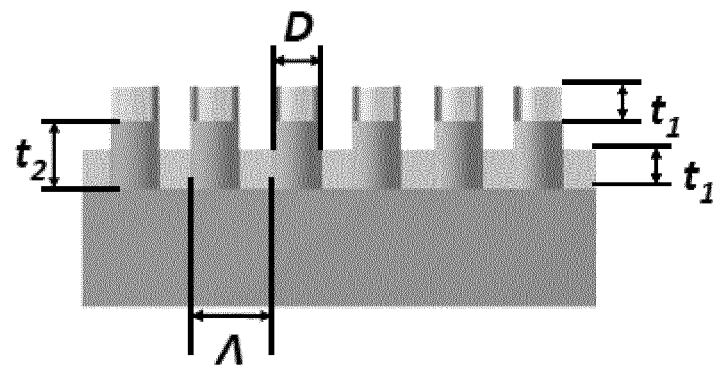
FIG. 5 shows a structure according to an exemplary embodiment with pillars in a support structure.

FIG. 5 shows a sample according to an exemplary embodiment with pillars (with height $t_2$) in a support structure, where they are arranged with periodicity $\nabla$, a metallic film (with thickness $t_1$) deposited thereon, and the resulting metallic disks and holes (each with corresponding thickness $t_1$).

In summary, the inventors have presented a method for true-colour laser printing on plasmonic metasurfaces with a sub-diffraction-limit resolution. The nanoimprinted metasurfaces are composed by a 20 nm Al buried in a thin-film polymer, which is super flexible, extremely economic and fully recyclable. Reconfigured by plasmon resonances, the suggested laser printing process allows for recording speeds up to 1 Gbit/s with a spot energy down to 0.3 nJ per pulse. Plasmonic field redistribution improved spatial resolution, that the melting can be carried out within single unit cell and the annealing can be well controlled within sub-20 nanometres dimensions. Colours are printed when only single unit cell is modified by laser heating with individual pixels of 200 nm 200 nm squares, thus enabling laser printing of colours at a resolution of 127,000 DPI. This technology promises exciting avenues from macro-scale colour painting and decoration to nanoscale colour patterning, encryption and data storage, where massive information densities are pursued.

To sum up, there is presented a method for geometrically modifying plasmonic structures on a support structure, such as for printing or recording, said method comprising changing a geometry specifically of plasmonic structures, wherein said changing the geometry is carried out by photothermally melting at least a portion of each of the plasmonic structures within the second plurality of plasmonic structures by irradiating, the plasmonic structures with incident electromagnetic radiation having an incident intensity in a plane of the second plurality of plasmonic structures, wherein said incident intensity is less than an incident intensity required to melt a film of a corresponding material and a corresponding thickness as the plasmonic structures within the second plurality of plasmonic structures.

In embodiments E1-E15 of the invention, there is presented:

E1. A method for geometrically modifying plasmonic structures on a support structure, said method comprising:
  a. Providing a support structure, said support structure being a solid polymer,
  b. Providing a first plurality of plasmonic structures, said plasmonic structures being supported by the support structure,
  c. Changing a geometry specifically of plasmonic structures within a second plurality of plasmonic structures, wherein the second plurality of plasmonic structures is a sub-set of the first plurality of plasmonic structures,
wherein said changing the geometry is carried out by photothermally melting at least a portion of each of the plasmonic structures within the second plurality of plasmonic structures by irradiating the second plurality of plasmonic structures with incident electromagnetic radiation having an incident intensity in a plane of the second plurality of plasmonic structures, and thereby exciting localized surface plasmon resonances associated with each of the plasmonic structures within the second plurality of plasmonic structures,
wherein said incident intensity is less than an incident intensity required to melt a film of a corresponding material and a corresponding thickness as the plasmonic structures within the second plurality of plasmonic structures.

E2. A method according to any one of the preceding embodiments, wherein said incident intensity is less than 75% of an incident intensity required to melt a film of corresponding material and thickness as the plasmonic structures within the second plurality of plasmonic structures.

E3. A method according to any one of the preceding embodiments, wherein the plasmonic structures within the second plurality of plasmonic structures redistribute photon energy in the incident electromagnetic radiation, thereby enabling said melting.

E4. A method according to any one of the preceding embodiments, wherein said support structure comprises a first plurality of topographical features.

E5. A method according to embodiment E4, wherein the plasmonic structures are given by:
  metallic structures on or in said topographical features, and
  holes in a metallic film, wherein said holes correspond to said topographical features.

E6. A method according to any one of embodiments E4-E5, further comprising
  preparing the topographical features,
  preparing the first plurality of plasmonic structures by depositing a metallic film on the support structure with the topographical features.

E7. A method according to any one of the preceding embodiments, wherein changing the geometry of a second plurality of plasmonic structures, comprises changing the geometry for different plasmonic structures within the second plurality of plasmonic structures into a plurality of different geometries.

E8. A method according to any one of the preceding embodiments, wherein changing the geometry of a plasmonic structure within second plurality of plasmonic structures is carried out in less than 1 millisecond.

E9. A method according to any one of the preceding embodiments, wherein changing the geometry of a second plurality of plasmonic structures, comprises changing the optical characteristics within a visible portion of the electromagnetic spectrum.

E10. A method according to any one of the preceding embodiments, wherein changing the geometry of a second plurality of plasmonic structures is carried out in a manner making the resulting change visible for a normal human viewer.

E11. A method according to any one of the preceding embodiments, wherein resolution of the geometrically modified plasmonic structures on the support structure is below the diffraction limit with respect to the incident electromagnetic radiation.

E12. A method according to any one of the preceding embodiments, wherein the photo-thermal energy is provided with any one of:
  A spot focused LASER,
  A spot focused LASER which is scanned through the second plurality of plasmonic structures so that changing the geometry is carried out in a sequential manner, A line focused LASER, A line focused LASER which is scanned through the second plurality of plasmonic structures so that changing the geometry is carried out in a sequential manner, A 2D array LASER A projected image.

E13. A method according to any one of the preceding embodiments, wherein the method further comprises geometrically modifying plasmonic structures on a support structure in one or more additional planes comprising additional plasmonic structures.

E14. A product comprising photothermally geometrically modified plasmonic structures and said product optionally further comprising the support structure.

E15. Use of a product comprising geometrically modified plasmonic structures provided according to the method according to any one of embodiments E1-E13, or a product according to embodiment E14, for any one of:

Macroscopically printing,

Microscopically printing,

Storing data,

Assessing laser power,

Sensing.

For the above embodiments E1-E15, it may be understood that reference to preceding 'embodiments' may refer to preceding embodiments within embodiments E1-E15.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for geometrically modifying plasmonic structures on a support structure, said method comprising:
   a. Providing the support structure, said support structure being a solid polymer,
   b. Providing a first plurality of plasmonic structures, said plasmonic structures being supported by the support structure,
   c. Spatially selecting plasmonic structures to be geometrically modified, and
   d. Changing an initial geometry specifically of plasmonic structures within a second plurality of the selected plasmonic structures to form geometrically modified plasmonic structures having a resultant geometry for use in a color printing process or data storage process, wherein the second plurality of plasmonic structures is a sub-set of the first plurality of plasmonic structures, wherein said changing the initial geometry is carried out by photothermally melting each of the plasmonic structures of at least a portion of the second plurality of plasmonic structures by irradiating the second plurality of plasmonic structures with incident electromagnetic radiation having an incident intensity in a plane of the second plurality of plasmonic structures, and thereby exciting localized surface plasmon resonances associated with the each of the plasmonic structures of the at least a portion of the second plurality of plasmonic structures, wherein said incident intensity is less than an incident intensity required to melt a film of a same material and a same thickness as the plasmonic structures within the second plurality of plasmonic structures, wherein said support structure comprises a first plurality of topographical features, wherein the first plurality of topographical features comprises topographical pillars formed on a surface of the support structure or topographical holes formed on the surface of the support structure, and wherein providing the first plurality of plasmonic structures comprises applying a metallic film to the support structure to form:

a plurality of metallic structures on said first plurality of topographical pillars or a plurality of metallic structures in said first plurality of topographical holes, and a plurality of holes in the metallic film around said first plurality of topographical pillars or holes, wherein the resultant geometry of the geometrically modified plasmonic structures is configured to produce a color printing resolution or a data recording resolution of at least 10 kDPI on the support structure or in the color printing process or the data storage process, wherein the color printing resolution or data recording resolution is obtained by the resolution of the geometrically modified plasmonic structures.

2. The method according to claim 1, wherein said incident intensity in the plane of the second plurality of plasmonic structures is less than 75% of the incident intensity required to melt the film of the same material and the same thickness as the plasmonic structures within the second plurality of plasmonic structures.

3. The method according to claim 1, wherein the plasmonic structures within the second plurality of plasmonic structures redistribute photon energy in the incident electromagnetic radiation, thereby enabling said melting.

4. The method according to claim 1, wherein changing the initial geometry of the plasmonic structures within the second plurality of plasmonic structures comprises forming a first subset of the geometrically modified plasmonic structures having a first color in an area and a second subset of the geometrically modified plasmonic structures having a second color different from the first color in the area so as to create a perceived color different than the first color and the second color.

5. The method according to claim 1, further comprising:

preparing the topographical features, and preparing the first plurality of plasmonic structures by depositing a metallic film on the support structure with the topographical features.

6. The method according to claim 1, wherein changing the initial geometry of the plasmonic structures within the second plurality of plasmonic structures comprises controlling the incident intensity in the plane of the second plurality of plasmonic structures to change the initial geometry of the plasmonic structures within the second plurality of plasmonic structures into a plurality of different geometries.

7. The method according to claim 1, wherein changing the initial geometry of a plasmonic structure within the second plurality of plasmonic structures is carried out in less than 1 millisecond.

8. The method according to claim 1, wherein changing the initial geometry of the plasmonic structures within the second plurality of plasmonic structures comprises changing one or more optical characteristics of the plasmonic structures of the at least a portion of the second plurality of plasmonic structures within a visible portion of the electromagnetic spectrum.

9. The method according to claim 1, wherein changing the initial geometry of the plasmonic structures within the second plurality of plasmonic structures is carried out in a manner wherein said changing the initial geometry results in a change in the plasmonic structures of the second plurality of plasmonic structures on the support structure that is visible for a normal human viewer.

10. The method according to claim 1, wherein the color printing resolution or the data recording resolution that the resultant geometry of the geometrically modified plasmonic structures is configured to produce on the support structure or in the color printing process or the data storage process is at least 100 kDPI.

11. The method according to claim 1, wherein a photothermal energy of the incident electromagnetic radiation is provided with any one of:

A spot focused LASER,

A spot focused LASER, which is scanned through the second plurality of plasmonic structures so that changing the initial geometry of the plasmonic structures within the second plurality of plasmonic structures is carried out in a sequential manner, A line focused LASER, A line focused LASER, which is scanned through the second plurality of plasmonic structures so that changing the initial geometry of the plasmonic structures within the second plurality of plasmonic structures is carried out in a sequential manner, A 2D array LASER, or A projected image.

12. The method according to claim 1, wherein the method further comprises geometrically modifying a third plurality of plasmonic structures on a second support structure in one or more additional planes comprising additional plasmonic structures.

* * * * *